(12) United States Patent
Candelore et al.

(10) Patent No.: US 11,797,153 B1
(45) Date of Patent: Oct. 24, 2023

(54) TEXT-ENHANCED EMOJI ICONS

(71) Applicant: SONY GROUP CORPORATION, Tokyo (JP)

(72) Inventors: Brant Candelore, Poway, CA (US); Adam Goldberg, Fairfax, VA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/883,033

(22) Filed: Aug. 8, 2022

(51) Int. Cl.
*G06F 3/04817* (2022.01)
*G06F 40/20* (2020.01)

(52) U.S. Cl.
CPC .......... *G06F 3/04817* (2013.01); *G06F 40/20* (2020.01)

(58) Field of Classification Search
CPC .................................................. G06F 3/04817
See application file for complete search history.

(56) References Cited

U.S. PATENT DOCUMENTS

| | | | |
|---|---|---|---|
| 2017/0300462 A1* | 10/2017 | Cudworth | G06T 11/60 |
| 2017/0308290 A1* | 10/2017 | Patel | G06F 3/04817 |
| 2018/0356957 A1* | 12/2018 | Desjardins | H04L 51/04 |
| 2021/0120053 A1* | 4/2021 | Shin | H04L 67/1068 |
| 2021/0397270 A1* | 12/2021 | Misra | G06F 3/0237 |
| 2022/0114776 A1* | 4/2022 | Xu | G06F 40/279 |
| 2022/0269354 A1* | 8/2022 | Prasad | G06F 40/30 |
| 2022/0301331 A1* | 9/2022 | Gothe | G06V 30/32 |

FOREIGN PATENT DOCUMENTS

| | | |
|---|---|---|
| EP | 3901786 A4 | 12/2021 |
| IN | 202011025978 A | 7/2021 |
| WO | 2021/098754 A1 | 5/2021 |

OTHER PUBLICATIONS

"Super cool unicode text magic. Make your words smile and frown", YayText, Unicode Faces Over Text—Smiley and Frowny Faces, Jan. 19, 2022, 4 pages.
"Bitmoji", Your personal Emoji, Snapchat Inc, URL: https://www.bitmoji.com/, 2022, 6 pages.
"Emoji Keyboard—Emojis for Chrome", Chrome Web Store, URL: https://chrome.google.com/webstore/search/emoji?hl=en, Mar. 29, 2022, 2 pages.

(Continued)

*Primary Examiner* — Roland J Casillas
(74) *Attorney, Agent, or Firm* — CHIP LAW GROUP

(57) ABSTRACT

A method for generation of a text-enhanced icon is disclosed. A first electronic device may determine a graphical icon associated with an emoji. The first electronic device may determine a set of texts associated with the emoji. The first electronic device may generate a text-enhanced icon based on the determined graphical icon and the determined set of texts. The generated text-enhanced icon may include the determined set of texts positioned at a set of defined locations associated with the determined graphical icon. The first electronic device may generate an encoded emoji sequence associated with the generated text-enhanced icon, based on the determined graphical icon, the determined set of texts, and the set of defined locations. The first electronic device may transmit the encoded emoji sequence to a second electronic device associated with the first electronic device to further render the generated text-enhanced icon.

20 Claims, 18 Drawing Sheets

(56) References Cited

OTHER PUBLICATIONS

Bora Kurum, "Use of Emoji in Modern Communication Within Symbolic Interactionist Perspective", Medium, Apr. 24, 2020, 15 pages.
"Appraising the linguistic value of emojis" Emory University, Phys.Org, May 4, 2017, 3 pages.
Lee Breslouer, "What the Most Confusing Emojis Actually Mean", Thrillist, Oct. 17, 2015, 18 pages.
Vyv Evans, "The Emoji Code", Videos URL: https://www.vyvevans.net/the-emoji-code, 2022, 3 pages.

* cited by examiner

| Input Emoji | Emoji Name | Meaning | Output Emoji |
|---|---|---|---|
|  | Face with Pleading Eyes | Pleading |  Pleading |
|  | Grinning Face with Smiling Eyes | Amused, Gratified |  Amused |
|  | Smiling Face | Positive Feelings |  Positive Feelings |
|  | Grinning Face with Star Eyes | Impressive, Amazing, Exciting |  Impressive |
|  | Grimacing Face | Nervous |  Nervous |

800A

| Input Emoji | Emoji Name | Meaning | Output Emoji |
|---|---|---|---|
| 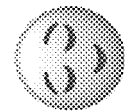 | Relieved Face | Content | 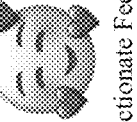 Content |
|  | Smiling Face with Open Mouth and Cold Sweat | Close Call, Whew! |  Close Call |
|  | Face with One Eyebrow Raised | Skeptical | 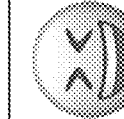 Skeptical |
| 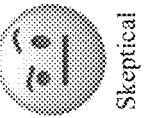 | Smiling Face with Smiling Eyes and Three Hearts | Affectionate Feelings |  Affectionate Feelings |
|  | Smiling Face with Open Mouth and Tightly-Closed Eyes | Hearty Laughter |  Hearty Laughter |

FIG. 8B

TEXT-ENHANCED EMOJI ICONS

CROSS-REFERENCE TO RELATED APPLICATIONS/INCORPORATION BY REFERENCE

None

FIELD

Various embodiments of the disclosure relate to text-enhanced emoji icons. More specifically, various embodiments of the disclosure relate to an electronic device and method for generation and display of text-enhanced emoji icons.

BACKGROUND

Advancements in messaging technology have led to an increase in use of various types of emojis to convey emotions between people. An emoji may correspond to a graphical icon or an image that may be representative of an emotion. Often, users may not know meaning of an emoji. Also, different messaging platforms may process and render a same emoji differently. Thus, even if a person knows a definition of the emoji, it may be difficult to figure out which emoji may be received, because the emoji may be represented differently by the different messaging platforms. For example, there may be stylistic differences of graphics associated with emojis between messaging platforms, which may affect how emojis may be represented. Also, as facial emojis may be similar with subtle differences, accurate attribution of differences between the different emojis may be difficult. For example, the subtle differences may include open eyes, closed eyes, or squinted eyes, or eyebrows tilted in a certain way. Moreover, the same emoji may or may not be animated. Further, even if the emojis may be differentiated, users may not remember meaning of all variations of the emojis. The definitions of each emoji may need to be carefully studied, in order to use the proper emoji that ascribes a correct meaning. Moreover, users with autism, attention deficit disorder (ADD), obsessive compulsive disorder (OCD), hearing impairment (for example, in case of deaf persons) may not recognize emojis and facial expressions accurately and hence, may not be able to understand the emoji.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for generation and display of text-enhanced emoji icons is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 8A and 8B are tables that illustrate an exemplary scenario for generation of text-enhanced icons, in accordance with an embodiment of the disclosure.

DETAILED DESCRIPTION

Figure 1:
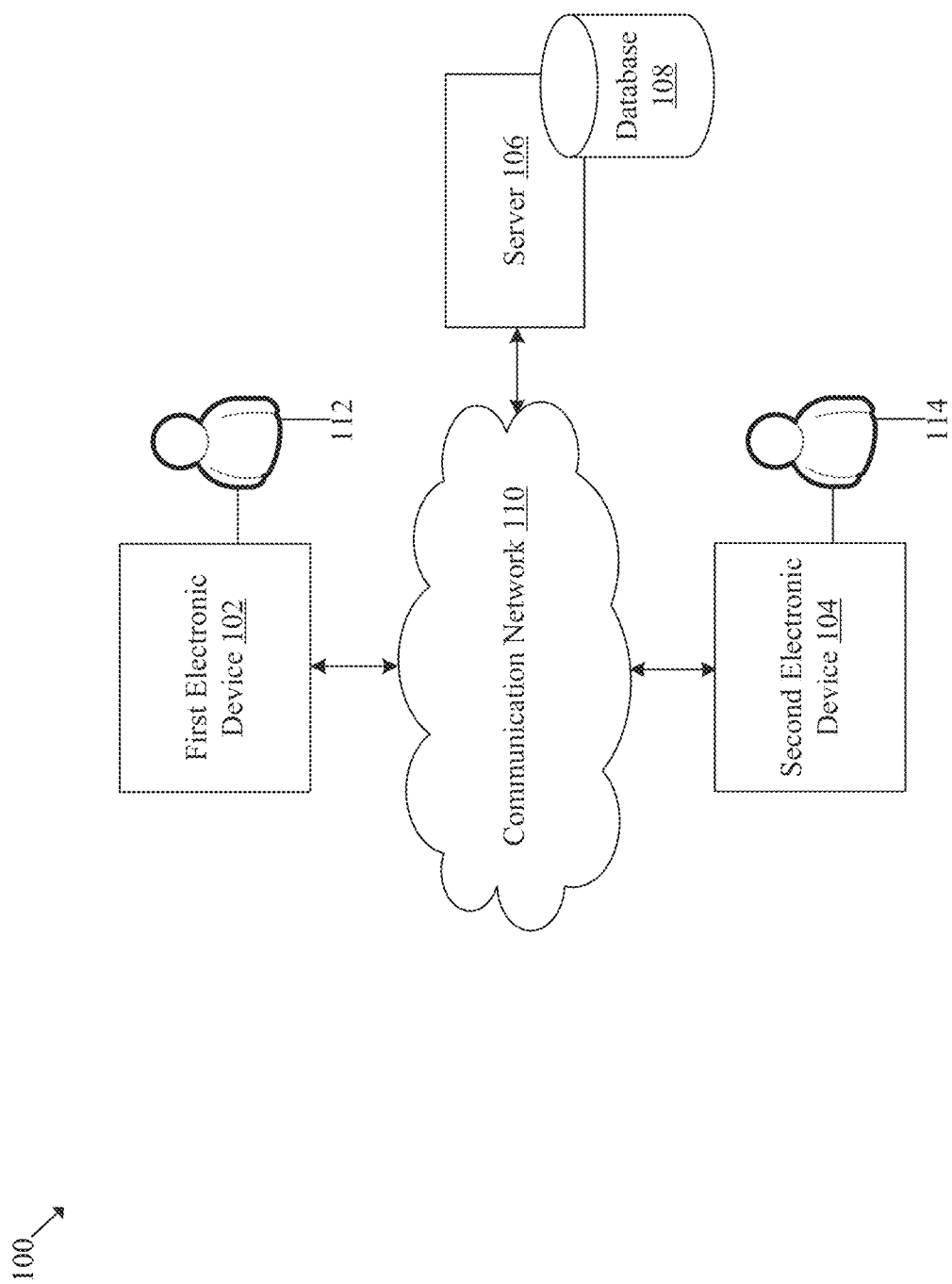
FIG. 1 is a block diagram that illustrates an exemplary network environment for generation of a text-enhanced emoji icon, in accordance with an embodiment of the disclosure.

The following described implementation may be found in the disclosed first electronic device and method for generation of text-enhanced emoji icons. Exemplary aspects of the disclosure may provide a first electronic device that may generate the text-enhanced emoji icons. The first electronic device (for example, a broadcasting server, or a broadcasting device) may determine a graphical icon (for example, a smiley icon) associated with an emoji (e.g., a happy emoji). The first electronic device may determine a set of texts (e.g., a related emotion, such as, "happiness") associated with the emoji. The first electronic device may generate a text-enhanced icon (e.g., an emoji icon with an embedded descriptive text) based on the determined graphical icon and the determined set of texts. For example, the determined set of texts associated with the emoji may correspond to at least one of a name, a meaning, a description, a question, a context, a source, a person, a group of persons, or an uncertainty. The generated text-enhanced icon may include the determined set of texts positioned at a set of defined locations (for example, left side of the graphical icon, right side of the graphical icon, or within the graphical icon) associated with the determined graphical icon. The first electronic device may generate an encoded emoji sequence (e.g., a Unicode character sequence) associated with the generated text-enhanced icon, based on the determined graphical icon, the determined set of texts, and the set of defined locations. The first electronic device may transmit, to a second electronic device associated with the first electronic device, the encoded emoji sequence to further render the generated text-enhanced icon.

The disclosure may provide a second electronic device (e.g., a receiver device) associated with the first electronic device. The second electronic device may receive an encoded emoji sequence (e.g., a Unicode character sequence) associated with a text-enhanced icon (for example, the emoji icon with an embedded descriptive text) from the first electronic device. The text-enhanced icon may be generated by the first electronic device and transmitted to the second electronic device as the encoded emoji sequence. The text-enhanced icon may be generated based on a graphical icon associated with an emoji, a set of texts associated with the emoji, and information about a set of defined locations associated with the graphical icon. The second electronic device may further decode the encoded emoji sequence associated with the generated text-enhanced icon. Further, the second electronic device may extract the graphical icon, the set of texts, and the information about the set of defined locations based on the decoded emoji sequence. The second electronic device may further render, on a display device associated with the second electronic device, the text-enhanced icon including the graphical icon and the set of texts positioned, based on the information about the set of defined locations.

The disclosed first electronic device may embed a description or meaning associated with an emotion at a certain position within an emoji icon to generate an encoded text-enhanced emoji icon. The first electronic device may transmit the encoded text-enhanced icon to the second electronic device, which may further decode the encoded text-enhanced icon and extract the descriptive text, emoji icon, and position information associated with the text-enhanced icon. Based on the extracted descriptive text, the emoji icon, and the position information, the second electronic device may render the text-enhanced icon. The disclosed first electronic device may enable a user to create custom emoji icons that may convey descriptive meanings associated with the emoji icon to a recipient. The descriptive meanings may provide users with flexibility to enrich an emoji icon based on intended context. The descriptive text may clarify an intended meaning of the emoji icon to a recipient. A recipient who may be unaware of a meaning of an emoji may accurately determine an intended meaning related to the emoji based on the descriptive text embedded with the emoji in the text-enhanced emoji icon. Thus, based on the descriptive text embedded within the emojis, users with autism, attention deficit disorder (ADD), obsessive compulsive disorder (OCD), hearing impairment (for example, in case of deaf persons), etc., may also be able to understand the intended meaning of the emoji. Also, since the text-enhanced icon may be encoded using standard character sequences (e.g., a Unicode character sequence), the text-enhanced icon may have cross-platform compatibility.

FIG. 1 is a block diagram that illustrates an exemplary network environment for generation of a text-enhanced emoji icon, in accordance with an embodiment of the disclosure. With reference to FIG. 1, there is shown a network environment 100. The network environment 100 may include a first electronic device 102, a second electronic device 104, a server 106, a database 108, and a communication network 110. The first electronic device 102, the second electronic device 104, the server 106 may be communicatively coupled to one another, via the communication network 110. In FIG. 1, there is further shown a first user 112, who may be associated with or operate the first electronic device 102 and a second user 114, who may be associated with or operate the second electronic device 104.

The first electronic device 102 may include suitable logic, circuitry, interfaces, and/or code that may be configured to generate a text-enhanced icon based on a graphical icon associated with an emoji and a set of texts associated with the emoji. The generated text-enhanced icon may include the set of texts positioned at a set of defined locations (for example, left side of the graphical icon, right side of the graphical icon, or within the graphical icon) associated with the graphical icon. The first electronic device 102 may be further configured to generate an encoded emoji sequence associated with the generated text-enhanced icon, based on the graphical icon, the set of texts, and the set of defined locations. The first electronic device 102 may be further configured to transmit, to the second electronic device 104 associated with the first electronic device 102, the encoded emoji sequence to further render the generated text-enhanced icon. Examples of the first electronic device 102 may include, but are not limited to, a computing device, a smartphone, a cellular phone, a mobile phone, a gaming device, a mainframe machine, a server, a computer workstation, and/or a consumer electronic (CE) device.

The second electronic device 104 may include suitable logic, circuitry, interfaces, and/or code that may be configured to receive, from the first electronic device 102, the encoded emoji sequence associated with the text-enhanced icon. The second electronic device 104 may be further configured to decode the encoded emoji sequence associated with the generated text-enhanced icon. The second electronic device 104 may be further configured to extract the graphical icon, the set of texts, and the information about the set of defined locations based on the decoded emoji sequence. The second electronic device 104 may be further configured to render, on a display device associated with the second electronic device 104, the text-enhanced icon including the graphical icon and the set of texts positioned based on the information about the set of defined locations. Examples of the second electronic device 104 may include, but are not limited to, a computing device, a smartphone, a cellular phone, a mobile phone, a gaming device, a mainframe machine, a server, a computer workstation, and/or a consumer electronic (CE) device.

The server 106 may include suitable logic, circuitry, and interfaces, and/or code that may be configured to process the graphical icon and the set of texts associated with the emoji. The server 106 may be further configured to generate the text-enhanced icon based on the determined graphical icon and the determined set of texts. The server 106 may be implemented as a cloud server and may execute operations through web applications, cloud applications, HTTP requests, repository operations, file transfer, and the like.

Other example implementations of the server 106 may include, but are not limited to, a database server, a file server, a web server, a media server, an application server, a mainframe server, or a cloud computing server.

In at least one embodiment, the server 106 may be implemented as a plurality of distributed cloud-based resources by use of several technologies that are well known to those ordinarily skilled in the art. A person with ordinary skill in the art will understand that the scope of the disclosure may not be limited to the implementation of the server 106, the first electronic device 102, and the second electronic device 104 as two separate entities. In certain embodiments, the functionalities of the server 106 can be incorporated in its entirety or at least partially in the first electronic device 102 and/or the second electronic device 104 without a departure from the scope of the disclosure. In certain embodiments, the server 106 may host the database 108. Alternatively, the server 106 may be separate from the database 108 and may be communicatively coupled to the database 108.

The database 108 may include suitable logic, interfaces, and/or code that may be configured to store set of emojis. For example, the database 108 may store images, graphical icons, animated pictures, or other media content associated with the set of emojis. The database 108 may be derived from data off a relational or non-relational database, or a set of comma-separated values (csv) files in conventional or big-data storage. The database 108 may be stored or cached on a device, such as a server (e.g., the server 106), the first electronic device 102 or the second electronic device 104. The device storing the database 108 may be configured to receive a query for an emoji and/or a graphical icon associated with the emoji from the first electronic device 102. In response, the device of the database 108 may be configured to retrieve and provide the queried emoji and/or graphical icon to the first electronic device 102 based on the received query.

In some embodiments, the database 108 may be hosted on a plurality of servers stored at same or different locations. The operations of the database 108 may be executed using hardware including a processor, a microprocessor (e.g., to perform or control performance of one or more operations), a field-programmable gate array (FPGA), or an application-specific integrated circuit (ASIC). In some other instances, the database 108 may be implemented using software.

The communication network 110 may include a communication medium through which the first electronic device 102, the second electronic device 104, and the server 106 may communicate with one another. The communication network 110 may be one of a wired connection or a wireless connection. Examples of the communication network 110 may include, but are not limited to, the Internet, a cloud network, Cellular or Wireless Mobile Network (such as Long-Term Evolution and $5^{th}$ Generation (5G) New Radio (NR)), a Wireless Fidelity (Wi-Fi) network, a Personal Area Network (PAN), a Local Area Network (LAN), or a Metropolitan Area Network (MAN). Various devices in the network environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the first electronic device 102 may be configured to determine the graphical icon associated with the emoji. It may be appreciated that the emoji may be an image, or an icon used for representing an emotion. Each emoji may be associated one or more characters. For example, characters ":-)" may represent an emoji of a smiling face. In an embodiment, the first user 112 may provide the characters associated with the emoji on a user interface provided on a display of the first electronic device 102. In another embodiment, the first user 112 may select the graphical icon associated with the emoji from a list of graphical icons. In case the emoji is one or more characters, the first electronic device 102 may fetch for the graphical icon associated with the emoji. Details related to the graphical icon are provided, for example, in FIG. 4.

The first electronic device 102 may be configured to further determine the set of texts associated with the emoji. The set of texts may help the second user 114 to understand a context, and/or a meaning of the emoji that is sent by the first user 112. The first electronic device 102 may be configured to receive textual information including information related to the emoji. The textual information may be an email message, a text message, a closed-captioned text, or a sub-title text. Further, the first electronic device 102 may apply a natural language processing (NLP) model (for example, an NLP model 214 of FIG. 2) on the received textual information. Thereafter, the first electronic device 102 determine a context associated with the received textual information based on the application of the NLP model on the received textual information. The set of texts associated with the emoji may be determined based on the determined context associated with the received textual information. Details related to the set of texts are provided, for example, in FIGS. 4 and 5.

The first electronic device 102 may be configured to further generate the text-enhanced icon based on the determined graphical icon and the determined set of texts. The generated text-enhanced icon may include the determined set of texts positioned at a set of defined locations associated with the determined graphical icon. Upon determination of the set of texts associated with the emoji, the first electronic device 102 may insert the determined set of texts at the set of defined locations to generate the text-enhanced icon. The set of defined locations may be determined such that an insertion of the determined set of texts at the set of defined locations may not alter a height, a width or a shape of the determined graphical icon. Details related to the set of defined locations are provided, for example, in FIG. 6.

The first electronic device 102 may be configured to further generate the encoded emoji sequence associated with the generated text-enhanced icon, based on the determined graphical icon, the determined set of texts, and the set of defined locations. It may be appreciated that the encoded emoji sequence may help to encode the generated text-enhanced icon. In an embodiment, a zero-width joiner (ZWJ) sequence may be generated. The ZWJ sequence may allow the concatenation of a number of emojis that a platform may render as one.

The first electronic device 102 may be configured to further transmit to the second electronic device 104 associated with the first electronic device 102, the encoded emoji sequence to further render the generated text-enhanced icon. The first electronic device 102 may transmit the encoded emoji sequence to the second electronic device 104 via the communication network 110. The second electronic device 104 may then display the generated text-enhanced icon on a display so the second user 114 may understand a context or meaning associated with the emoji icon. Thus, even if the second user 114 uses a different messaging platform that the second user 114 may not be familiar with, the display of the generated text-enhanced icon may enable the second user 114 to understand the meaning of the determined graphical icon. Moreover, if the second user 114 is unable to distinguish between the emojis, the display of the generated text-enhanced icon (i.e., descriptive text embedded at defined locations in the icon) may enable the second user 114 to understand an intent behind the emoji based on the set of descriptive texts. Furthermore, the second user 114 may not have to carefully study meanings of the emoji in order to identify the determined graphical icon, as the meaning may be apparent from the generated text-enhanced icon.

Figure 2:
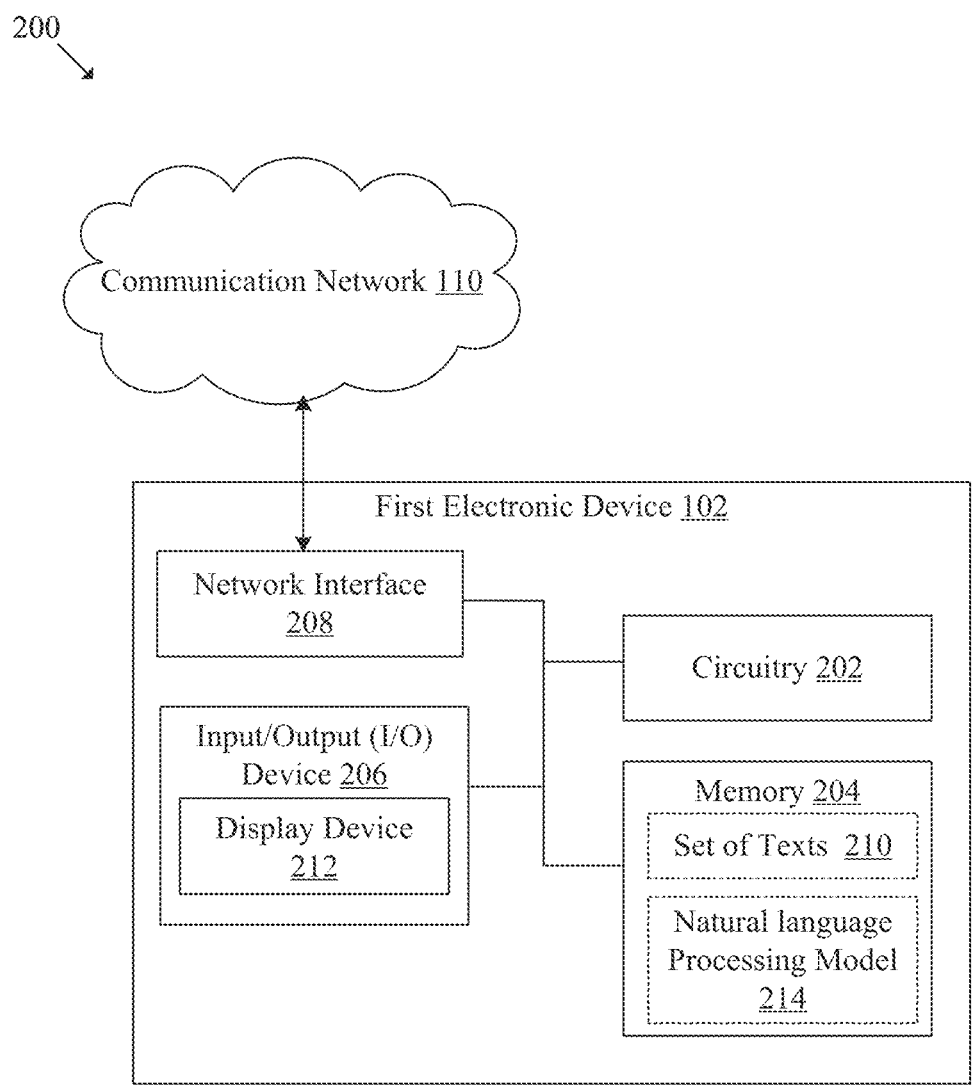
FIG. 2 is a block diagram that illustrates an exemplary first electronic device of FIG. 1, in accordance with an embodiment of the disclosure.

FIG. 2 is a block diagram that illustrates an exemplary first electronic device of FIG. 1, in accordance with an embodiment of the disclosure. FIG. 2 is explained in conjunction with elements from FIG. 1. With reference to FIG. 2, there is shown the exemplary first electronic device 102. The first electronic device 102 may include circuitry 202, a memory 204, an input/output (I/O) device 206, and a network interface 208. The memory 204 may include a set of texts 210, and the input/output (I/O) device 206 may include a display device 212. The memory 204 may further include a natural language processing (NLP) model 214. The network interface 208 may connect the first electronic device 102 with the second electronic device 104, via the communication network 110.

The circuitry 202 may include suitable logic, circuitry, and/or interfaces that may be configured to execute program instructions associated with different operations to be executed by the first electronic device 102. The operations may include determination of the graphical icon, the determination of the set of texts, the generation of the text-enhanced icon, the generation of the encoded emoji-sequence, and the transmission of the encoded emoji-sequence. The circuitry 202 may include one or more processing units, which may be implemented as a separate processor. In an embodiment, the one or more processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The one or more instructions stored in the memory 204 may be configured to execute the different operations of the circuitry 202 (and/or the first electronic device 102). The memory 204 may be configured to store the set of texts 210. In an embodiment, the memory 204 may store a plurality of emojis. Further, the memory 204 may store the graphical icon, the text-enhanced icon, the encoded emoji-sequence. In addition, in certain cases, the memory 204 may further store a look-up table that may include a mapping between a Unicode character associated with the encoded emoji-sequence and the text-enhanced icon. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive a user input indicative of an emoji selected by the first user 112. Further, the I/O device 206 may receive a user input indicative of a descriptive text and/or a predefined location associated with a graphic icon of the selected emoji, from the first user 112. The text-enhanced icon may be generated based on the selected emoji, the descriptive text, and the predefined location associated with the graphic icon of the selected emoji. The I/O device 206 may be further configured to display the generated text-enhanced icon to the first user 112. The I/O device 206 may include various input and output devices, which may be configured to communicate with the circuitry 202. The I/O device 206 may include the display device 212. Examples of the I/O device 206 may include, but are not limited to, a touch screen, a keyboard, a mouse, a joystick, a microphone, or a speaker.

The network interface 208 may include suitable logic, circuitry, interfaces, and/or code that may be configured to facilitate communication between the first electronic device 102 and the second electronic device 104. The network interface 208 may be implemented by use of various known technologies to support wired or wireless communication of the first electronic device 102 with the communication network. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The display device 212 may include suitable logic, circuitry, and interfaces that may be configured to display a plurality of emoji icons, descriptive text associated with each emoji icon, and/or the generated text-enhanced icon. The display device 212 may be a touch screen which may enable a user (e.g., the first user 112) to provide a user-input via the display device 212. The touch screen may be at least one of a resistive touch screen, a capacitive touch screen, or a thermal touch screen. The display device 212 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 212 may refer to a display screen of a head mounted device (HMD), a smart-glass device, a see-through display, a projection-based display, an electro-chromic display, or a transparent display.

The NLP model 214 may include a neural network that may be trained to determine a context of a received textual information. The neural network may be a computational network or a system of artificial neurons, arranged in a plurality of layers, as nodes. The plurality of layers of the neural network may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from hyper-parameters of the neural network. Such hyper-parameters may be set before, while training, or after training the neural network on a training dataset.

Each node of the neural network may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to same or a different same mathematical function.

In training of the neural network, one or more parameters of each node of the neural network may be updated based on whether an output of the final layer for a given input (from the training dataset) matches a correct result based on a loss function for the neural network. The above process may be repeated for same or a different input until a minima of loss function may be achieved, and a training error may be minimized. Several methods for training are known in art, for example, gradient descent, stochastic gradient descent, batch gradient descent, gradient boost, meta-heuristics, and the like. Once trained, the neural network or the NLP model 214 of the present disclosure may accept the textual information as an input to determine a context of the received textual information. The determined context may be used to determine the set of texts. Various operations of the circuitry 202 for generation of the text-enhanced icon are described further, for example, in FIG. 4. The operations of the circuitry 202 for the determination of the set of texts are described further, for example, in FIG. 5.

Figure 3:
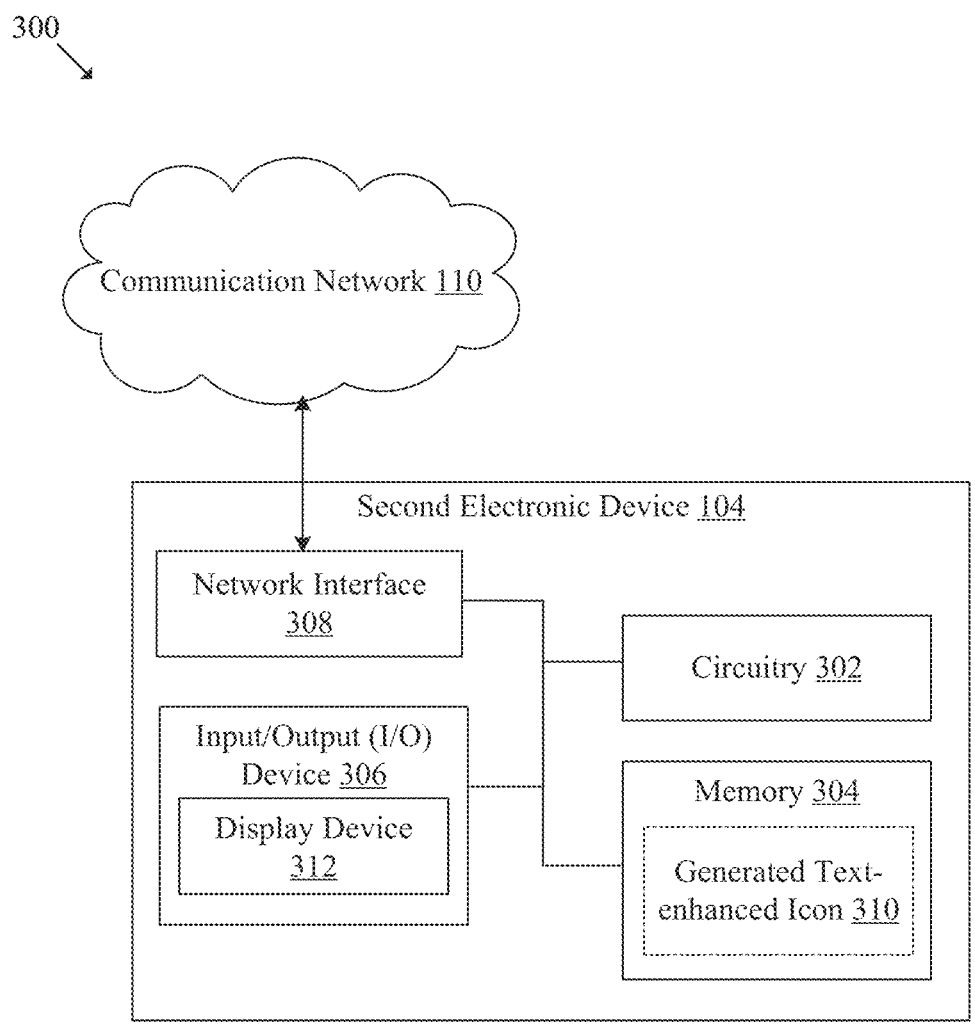
FIG. 3 is a block diagram that illustrates an exemplary second electronic device of FIG. 1, in accordance with an embodiment of the disclosure.

FIG. 3 is a block diagram that illustrates an exemplary second electronic device of FIG. 1, in accordance with an embodiment of the disclosure. FIG. 3 is explained in conjunction with elements from FIG. 1 and FIG. 2. With reference to FIG. 3, there is shown the exemplary second electronic device 104. The second electronic device 104 may include circuitry 302, a memory 304, an input/output (I/O) device 306, and a network interface 308. The memory 304 may include a generated text-enhanced icon 310 and the input/output (I/O) device 306 may include a display device 312. The network interface 308 may connect the second electronic device 104 with the first electronic device 102.

The circuitry 302 may include suitable logic, circuitry, and/or interfaces that may be configured to execute program instructions associated with different operations to be executed by the second electronic device 104. For example, the operations may include reception of the encoded emoji sequence associated with the generated text-enhanced icon, from the first electronic device 102. The operations may further include decoding of the encoded emoji sequence and rendering of the text-enhanced icon based on the decoding. The circuitry 302 may include one or more processing units, which may be implemented as a separate processor. In an embodiment, the one or more processing units may be implemented as an integrated processor or a cluster of processors that perform the functions of the one or more specialized processing units, collectively. The circuitry 302 may be implemented based on a number of processor technologies known in the art. Examples of implementations of the circuitry 302 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 304 may include suitable logic, circuitry, interfaces, and/or code that may be configured to store one or more instructions to be executed by the circuitry 302. The memory 304 may be configured to store the generated text-enhanced icon 310. In an embodiment, the memory 304 may store a plurality of emojis. In addition, in certain cases, the memory 304 may further store a look-up table that may include a mapping between a Unicode character associated with the encoded emoji-sequence and the text-enhanced icon. Examples of implementation of the memory 304 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The functions of the input/output (I/O) device 306, the network interface 308, and the display device 312 may be same as the functions of the input/output (I/O) device 206, the network interface 208, and the display device 212, respectively, as described, for example, in FIG. 2. Therefore, the description of the input/output (I/O) device 306, the network interface 308, and the display device 312 is omitted from the disclosure for the sake of brevity.

Figure 4:
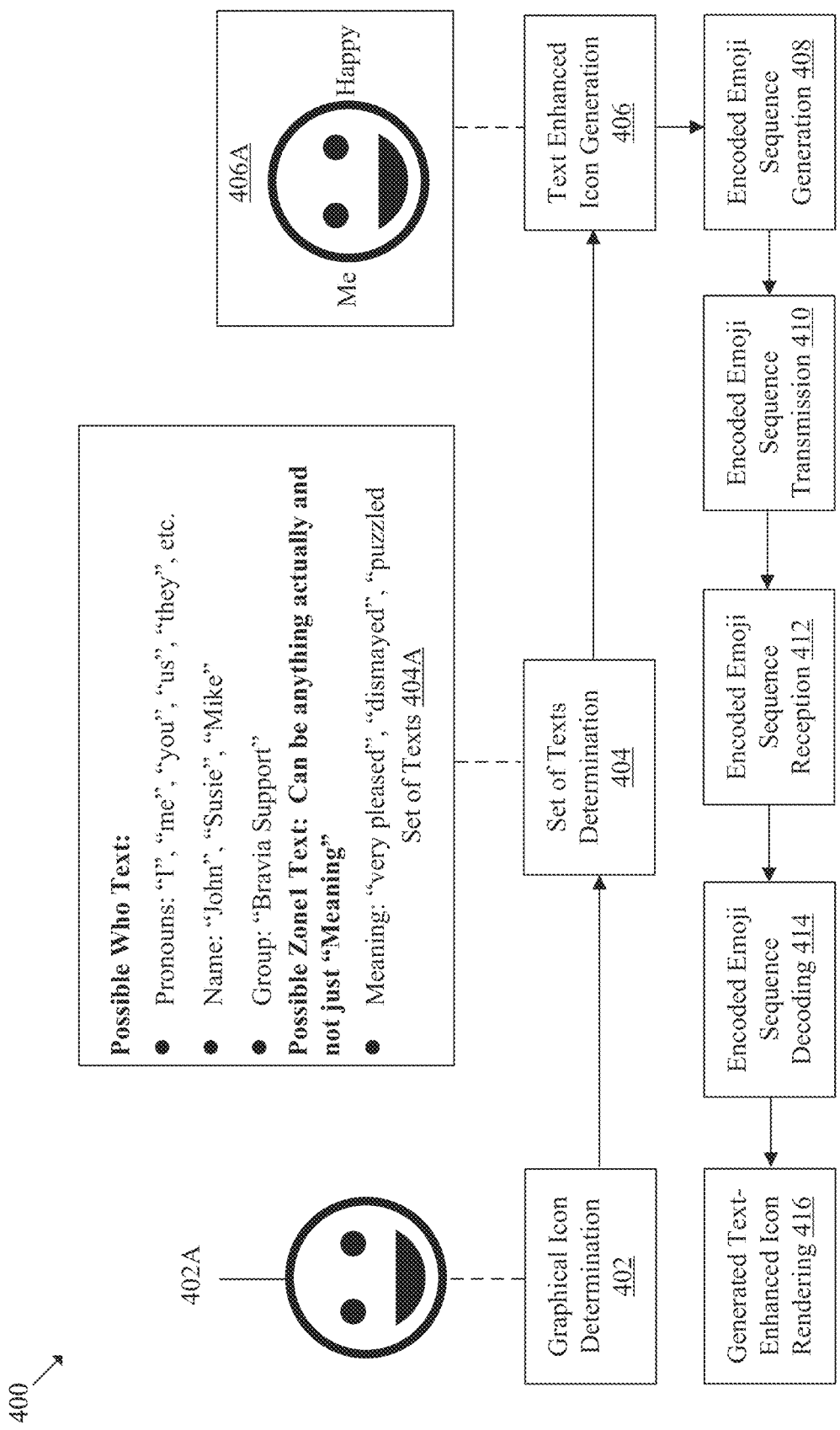
FIG. 4 is a diagram that illustrates an exemplary processing pipeline for generation of the text-enhanced icon, in accordance with an embodiment of the disclosure.

FIG. 4 is a diagram that illustrates an exemplary processing pipeline for generation of the text-enhanced icon, in accordance with an embodiment of the disclosure. FIG. 4 is explained in conjunction with elements from FIG. 1, FIG. 2, and FIG. 3. With reference to FIG. 4, there is shown an exemplary processing pipeline 400 that illustrates exemplary operations from 402 to 416 for generation of the text-enhanced icon. The exemplary operations 402 to 410 may be executed by any computing system, for example, by the first electronic device 102 of FIG. 1 or by the circuitry 202 of FIG. 2. The exemplary operations 412 to 416 may be executed by any computing system, for example, by the second electronic device 104 of FIG. 1 or by the circuitry 302 of FIG. 3. The exemplary processing pipeline 400 further illustrates a graphical icon 402A, a set of texts 404A, and a text-enhanced icon 406A.

In an embodiment, the first electronic device 102 may correspond to a broadcasting server, or a broadcasting device. It may be appreciated that the broadcasting server may store media content and deliver the stored media content to client device such as, the second electronic device 104. The broadcasting server of the present disclosure may receive the emoji, and determine the set of texts associated with the graphical icon 402A to generate the text-enhanced icon 406A. The broadcasting device such as, computers, routers, and the like may transmit messages to each device connected to the broadcasting device. The broadcasting device of the present disclosure may transmit the generated text-enhanced icon 406A via the communication network 110.

At 402, the graphical icon may be determined. The circuitry 202 may be configured to determine the graphical icon associated with the emoji. As discussed, an emoji may be an image or an icon that may be used to represent an emotion such as, a happy emotion, a sad emotion, a grinning emotion, and the like. The emoji may help to provide an emotional cue. It may be noted that the emoji may have modifiers such as, skin tone. Each emoji may be associated with a combination of certain specific characters. For example, characters ":-)" may represent an emoji with a smiling face. Similarly, combination of characters ":-D" may represent an emoji for a thrilled face. In an embodiment, the circuitry 202 may be configured to receive the emoji based on an input provided by the first user 112 through the user interface provided on the display device 212 of the first electronic device 102. The input may include a combination of characters associated with the emoji. In another embodiment, the circuitry 202 may receive a user input from the first user 112, wherein the user input may include a selection of the graphical icon associated with the emoji from a list of graphical icons. The graphical icon may be the image associate with the emoji. In case the emoji is received based on the user input including the sequence of characters associated with the emoji, the circuitry 202 may look up for the graphical icon that may be associated with the received sequence of characters. For example, if the first user 112 provides the sequence of characters ":-|" on a rich textbox on the user interface provided on the display device 212, then the circuitry 202 may determine the graphical icon as a blank face. However, in case emoji is received based on the user input indicative of the selection of the emoji from the plurality of emojis, a graphical icon of the selected emoji may be determined. For example, if the first user 112 selects the happy face emoji on the user interface provided on the display device 212 then the circuitry may determine a happy face image as the graphical icon. For example, with reference to FIG. 4, the determined graphical icon 402A is shown.

In an embodiment, the circuitry 202 may be further configured to receive the emoji based on a user input including a sequence of characters associated with the emoji. As discussed, each emoji may be associated with the sequence of characters. For example, the sequence of characters ":-P" may be associated with tongue hanging out emoji and the sequence if characters ":-(" may be associated with a sad face emoji. The display device 212 of the first electronic device 102 may provide the rich textbox on the user interface provided on the display device 212 in order to receive the user input. For example, the first user 112 may provide the sequence of characters ":-|" on the rich textbox on the user interface provided on the display device 212.

In another embodiment, the circuitry 202 may be further configured to receive the emoji based on a user input indicative of a selection of the emoji from a plurality of emojis. The user interface may provide the plurality of emojis such as, a sad face emoji, a happy face emoji, a grinning face emoji, a smiling face emoji, a blank face emoji, a dancing girl emoji, a bike emoji, and the like. The plurality of emojis of emojis may be provided as a dropdown list, as a grid, and the like, on the display device 212. In an example, the first user 112 may select the blank face emoji on the user interface provided on the display device 212. The circuitry 202 may receive the emoji as the blank face emoji.

At 404, the set of texts may be determined. The circuitry 202 may be configured to determine the set of texts associated with the emoji. The set of texts may help the second user 114 to understand a context, an intent, and/or a meaning of the emoji that may be sent by the first user 112 via the first electronic device 102. The determined set of texts may need to be represented in a universally readable character code (e.g., Unicode) to support letters, script and symbols, which may be compatible across different messaging platforms. Further, the set of texts may have a predefined font size that may be smaller or larger than a size of the graphic icon associated with the emoji.

In an embodiment, the determined set of texts associated with the emoji may correspond to at least one of: a name, a meaning, a description, a question, a context, a source, a person, a group of persons, or an uncertainty. The name may be a unique name such as, a "happy" face emoji, a "sad" face emoji, a "blank" face emoji, and the like that may be assigned to the emoji. The meaning may be a definition such as, happy, sad and the like of the emoji. It may be noted that, new meanings may be ascribed to the emojis, based on user input associated with the set of texts, received from the first user 112. In such a case merely going through the context of messages sent along with the emoji may not be helpful. The meaning of the emoji may differ depending on culture and ethnic reasons. Hence, the meaning of the emoji may be also sent along with the emoji. The description may further elaborate the emoji, for example, the description may state very sad (or a specific degree of a sad emotion) for the emoji, such as, the sad face emoji. The question may help to pose a question associated with the emoji to the second user 114. For example, if the emoji is the sad face emoji, the question may be "are you sad?". The context may correspond to a contextual meaning that may be assigned to the emoji. It may be noted that the context associated with the emoji may vary from person to person. For example, the context associated with the emoji that is a face with open mouth may be surprised, shocked, and the like. Thus, assignment of the context to the emoji may help the second user 114 to comprehend what the first user 112 may intend to say. The source may be a source from where the emoji is retrieved. The person may represent a person to whom the emoji may be directed. It may be noted that typically emojis may not indicate the emotion of a sender such as, the first user 112. Hence, the assignment of a person to the emoji may indicate the person with whom the emotion of the emoji may be associated with. For example, in case, the emoji is a sad face emoji and the person is be Jack, the meaning of the emoji associated with the person may indicate that Jack may be sad. The group of persons may be two or more persons to which the emoji may be directed. For example, the emoji may be the happy face emoji and the group of persons may be a first person 'A', a second person 'B', and a third person 'C'. Thus, in the current scenario, the emoji associated with the group of persons may indicate that the group of persons (e.g., persons 'A', 'B', and 'C') may be happy. The uncertainty may provide a degree of uncertainty associated with the emoji. For example, the first user 112 may be uncertain on whether the second user 114 is sad or not. The uncertainty may be a question such as, "are you sad?". It may be noted that the set of determined texts may be optionally customized by the first user 112 to override possible default text.

For example, with reference to FIG. 4, the set of texts 404A may correspond to the person to whom the emoji is directed to. The person may be indicated based on pronouns, such as, "I", "me", "you", "us", "they", and the like. The person may further be name of the person to whom the emoji may be directed to such as, "John", "Susie", "Mike", and the like. The person may be a group such as "Help & Support Team". With reference to FIG. 4 the set of texts 404A may be the meaning of the emoji such as, "very pleased", "dismayed", "puzzled", and the like. In an embodiment, the set of texts may be determined based on a user input or may correspond to defined texts associated with the emoji.

In an embodiment, the set of texts may be determined based on the user input. The circuitry 202 may receive a user input associated with the set of texts from the first user 112, through the user interface of the display device 212. For example, the set of texts may be the meaning which may be "sad" and the person which may be the pronoun "me" associated with the emoji. The user input may be received via a virtual keyboard, a physical keyboard, or a touch screen, by a selection from a drop-down menu, and the like. In another example, the meaning "sad" and the pronoun "me" may be received from the first user 112 through relevant fields provided on the user interface of the display device 212.

In an embodiment, the determined set of texts may correspond to defined texts associated with the emoji. The defined texts may be default texts that may be associated with the emoji. For example, the defined texts may be meaning such as, sad, happy, laughing, crying, and the like of the emoji. In another example, the defined text may be a name of the first user 112. The circuitry 202 may automatically pick default name of the first electronic device 102 that may be assigned at a time of registration of the first electronic device 102 as the determined set of texts.

At 406, the text-enhanced icon may be generated. The circuitry 202 may be configured to generate the text-enhanced icon based on the determined graphical icon and the determined set of texts. The generated text-enhanced icon may include the determined set of texts positioned at the set of defined locations associated with the determined graphical icon. Upon determination of the set of texts associated with the emoji, the circuitry 202 may insert the determined set of texts at the set of defined locations to generate the text-enhanced icon. As discussed, the set of defined locations may be chosen such that an insertion of the determined set of texts at the set of defined locations may not alter the height, the width, or the shape of the determined graphical icon. It may be noted that the determined set of texts may be added to an emoji.

In an embodiment, the set of defined locations may be determined based on a user input. The set of defined locations may include at least one of: a first location at a left-outer region of the determined graphical icon, a second location at a right-outer region of the determined graphical icon, a third location at a top-outer region of the determined graphical icon, a fourth location at a bottom-outer region of the determined graphical icon, or a fifth location at an internal region of the determined graphical icon. The set of defined locations may be determined so as to not alter the determined graphical icon. For example, the first location at the left-outer region of the determined graphical icon and the second location at the right-outer region of the determined graphical icon may be suitable to position the determined set of texts, as the use of the first location and the second location for the descriptive text may not alter the determined graphical icon. However, the third location at the top-outer region of the determined graphical icon, the fourth location at the bottom-outer region of the determined graphical icon, or the fifth location at the internal region of the determined graphical icon may alter the determined graphical icon or change a vertical size and allocated screen space of the determined graphical icon. It may be noted that color of the determined set of texts may be chosen according to a tone of the determined graphical icon so that the determined set of texts may stand out and may be easily readable. For example, a first color associated with a tone of the graphical icon and a second color associated with a font/highlighting of the descriptive text may be complementary colors, which may be chosen to provide a contrast of colors associated with the text-enhanced icon. In an embodiment, the set of defined locations at which the determined set of texts may be positioned may be selected based on a user input from the first user 112. For example, with reference to FIG. 4, the text-enhanced icon 406A may be generated such that the determined set of texts may be positioned at the first location and the second location associated with the determined graphical icon. The text related to the person "me" associated with the emoji may be positioned at the first location and the meaning "happy" of the emoji may be positioned at the second location. It may be noted that all locations may not be used at one time. Details related to the set of defined locations are further provided, for example, in FIG. 6.

In an embodiment, the circuitry 202 may be further configured to receive a user input indicative of whether to enable text positioning within the text-enhanced icon. The generation of the text-enhanced icon may be further based on the received user input. It may be noted that the text-enhanced icon may not need to be generated for each emoji and may be generated when the first user 112 may desire. Hence, the text-enhanced icon may be enabled or disabled based on a choice of the first user 112. In an example, a question such as, turn on text positioning with two options such as "yes" and "no" may be displayed on the display device 212. The first user 112 may select one of the displayed options. If "yes" is selected, then the text positioning may be enabled, and the text-enhanced icon may be generated. However, if "no" is selected then the text positioning may not be enabled, and the text-enhanced icon may not be generated.

It may be noted that the positioning of the determined set of texts to generate the text-enhanced icon might apply to various communication modes where emojis may be used, such as, but not limited to, closed-captioning texts, text messages, email messages, web pages, and word documents. An "emoji text" may be defined that may allow an arbitrary number of letters, spaces, and possibly words such as, one word, two words, or three words.

At 408, the encoded emoji sequence may be generated. The circuitry 202 may be configured to generate the encoded emoji sequence associated with the generated text-enhanced icon, based on the determined graphical icon, the determined set of texts, and the set of defined locations. It may be appreciated that the encoded emoji sequence may represent the generated text-enhanced icon as a character sequence (such as, a Unicode sequence). The encoding may help to convert the generated text-enhanced icon into a form that may be transmitted and decoded at the receiver end. For example, a zero-width joiner (ZWJ) Sequence may be employed to encode the generated text-enhanced icon associated with the emoji. The ZWJ Sequence may enable a concatenation of a number of emojis that various messaging platforms may render as one. However, a behavior of the ZWJ Sequence may be modified such that the appended character may not be an emoji glyph, but rather a string of Unicode text.

Figure 6:
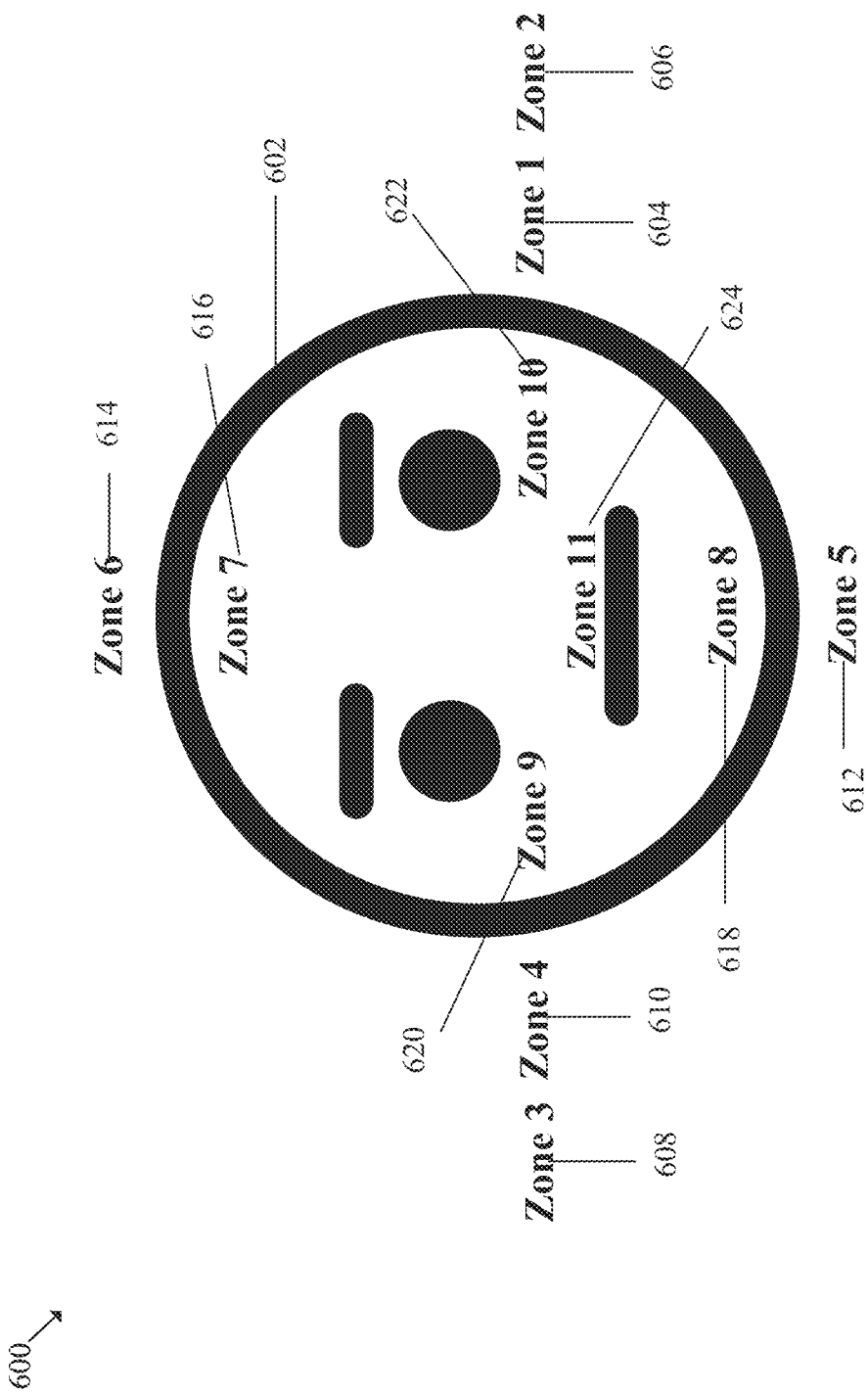
FIG. 6 is a diagram that illustrates an exemplary scenario of a set of defined locations for determination of the generated text-enhanced icon, in accordance with an embodiment of the disclosure.

In an embodiment, the encoded emoji sequence may correspond to a Unicode character sequence. The Unicode character sequence may represent each emoji by a code point, which may be a hexadecimal number. For example, the Unicode character sequence U+1F603 may be correspond to a grinning face emoji. Similarly, the Unicode character sequence for the generated text-enhanced icon may be generated. A first hex byte of the string may be associated with zones locations "1" to "11", as shown in FIG. 6. In an embodiment, the determined set of texts may be designed into the determined graphical icon itself which may require a separate Unicode character sequence that may not be desirable.

An exemplary code for generation of the Unicode character sequence is provided below in following code lines (1), (2), (3), and (4):

$$emoji\_zwj\_sequence := emoji\_ZWJ\_element(ZWJ\ emoji\_zwj\_element) + ZWJ := x\{200d\} \quad (1)$$

$$emoji\_zwj\_element := emoji\_character|emoji\_presentation\_sequence|emoji\_modifier\_sequence|emoji\_Text\_sequence \quad (2)$$

$$emoji\_Text\_Sequence := Hex1, Unicode\_char1\ to\ Unicode\_charN, Hex2 \quad (3)$$

Logic: If emoji_character not=character or sequence or modifier, then emoji_text_sequence. (4)

Hex1=zone # in hex, for example, 01x, 02x, 03x, 04x, 05x, 06x, 07x, 10x, 11x, 12x, 13x; and
Hex2="00" hex for null character to terminate the text string. It may be noted that a messaging platform may be able to represent the generated text-enhanced icon (that is, the set of texts at particular zones of the determined graphical icon) as one icon if desired by use of modified fonts.

At 410, the encoded emoji sequence may be transmitted. The circuitry 202 may be configured to transmit, to the second electronic device 104 associated with the first electronic device 102, the encoded emoji sequence to further render the generated text-enhanced icon. The first electronic device 102 may transmit the encoded emoji sequence to the second electronic device 104, via the communication network 110.

At 412, the encoded emoji sequence may be received. The circuitry 302 of the second electronic device 104 may be configured to receive, from the first electronic device 102, the encoded emoji sequence associated with the generated text-enhanced icon. A receiver (e.g., the network interface 308) associated with the second electronic device 104 may receive the encoded emoji sequence. Optionally, the determined set of texts can be optionally turned on in a global rendering of emojis on the second electronic device 104.

At 414, the (received) encoded emoji sequence may be decoded. The circuitry 302 of the second electronic device 104 may be configured to decode the (received) encoded emoji sequence associated with the generated text-enhanced icon. The encoded emoji sequence associated with the generated text-enhanced icon may be decoded to retrieve the generated text-enhanced icon. In an example, the circuitry 302 may decode the Unicode character sequence based on a look-up of a Unicode character sequence to obtain the generated text-enhanced icon.

It may be noted that emoji representation based on the determined set of text (such as, the generated text-enhanced icon) may be similar to emojis representation based on skin tones, by use of character sequences or extensions that may or may not be supported by a receiver such as, the second electronic device 104. If the generated text-enhanced icon is supported by the second electronic device 104, then the second electronic device 104 may decode the encoded emoji sequence associated with the generated text-enhanced icon on reception of the encoded emoji sequence by the second electronic device 104.

At 416, the generated text-enhanced icon may be rendered. The circuitry 302 may be configured to render, on a display device (e.g., the display device 312) associated with the second electronic device 104, the generated text-enhanced icon based on the decoded emoji sequence. For example, the circuitry 302 may render the text-enhanced icon 406A on the display device 312.

The disclosed first electronic device 102 may embed a description or meaning associated with an emotion at a certain position within an emoji icon to generate an encoded text-enhanced emoji icon. The first electronic device 102 may transmit the encoded text-enhanced icon to the second electronic device 104, which may decode the encoded text-enhanced icon and extract the descriptive text, emoji icon, and position information associated with the text-enhanced icon. Based on the extracted descriptive text, the emoji icon, and the position information, the second electronic device may render the text-enhanced icon. The disclosed first electronic device 102 may enable a user (such as, the first user 112) to create custom emoji icons that may convey descriptive meanings associated with the emoji icon to a recipient. The descriptive meanings may provide users with flexibility to enrich an emoji icon based on intended context. The descriptive text may clarify an intended meaning of the emoji icon to a recipient. A recipient (for example, the second user 114) who may be unaware of a meaning of an emoji may accurately determine an intended meaning related to the emoji based on the descriptive text embedded with the emoji in the text-enhanced emoji icon. Thus, based on the descriptive text embedded within the emojis, users with autism, attention deficit disorder (ADD), obsessive compulsive disorder (OCD), hearing impairment (for example, in case of deaf persons), etc., may also be able to understand the intended meaning of the emoji. Also, since the text-enhanced icon may be encoded using standard character sequences (e.g., a Unicode character sequence), the text-enhanced icon may have cross-platform compatibility.

Figure 5:
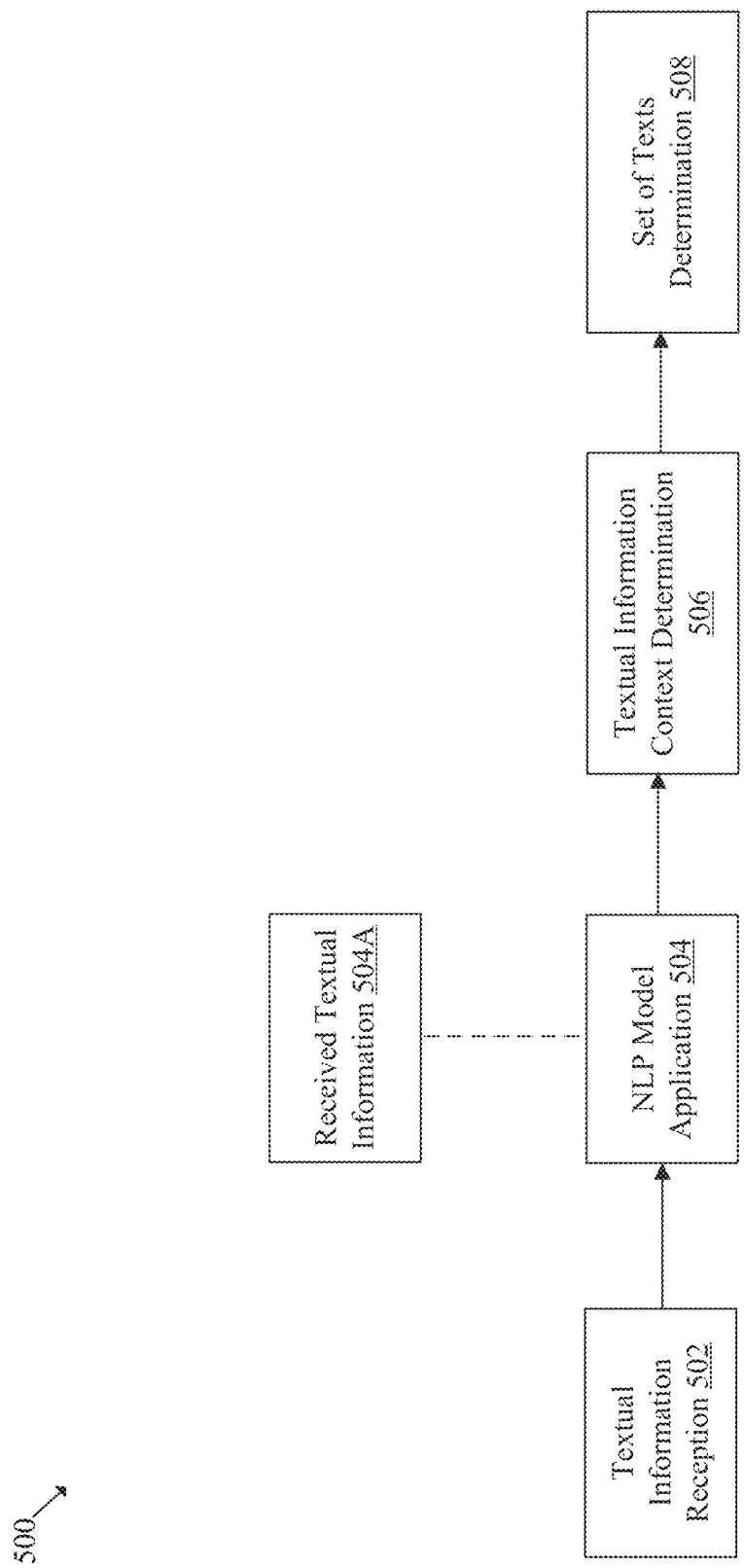
FIG. 5 is a diagram that illustrates an exemplary processing pipeline for determination of a set of texts associated with an emoji based on a determined context, in accordance with an embodiment of the disclosure.

FIG. 5 is a diagram that illustrates an exemplary processing pipeline for determination of a set of texts associated with an emoji based on a determined context, in accordance with an embodiment of the disclosure. FIG. 5 is explained in conjunction with elements from FIG. 1, FIG. 2, FIG. 3, and FIG. 4. With reference to FIG. 5, there is shown an exemplary processing pipeline 500 that illustrates exemplary operations from 502 to 508 for determination of the set of texts associated with the emoji based on the determined context. The exemplary operations may be executed by any computing system, for example, by the first electronic device 102 of FIG. 1 or by the circuitry 202 of FIG. 2.

In an embodiment, the circuitry 202 may be further configured to receive textual information including information related to the emoji. The circuitry 202 may be further configured to apply a natural language processing (NLP) model (e.g., the NLP model 214) on the received textual information. The circuitry 202 may be further configured to determine a context associated with the received textual information based on the application of the NLP model 214 on the received textual information. The set of texts associated with the emoji may be determined based on the determined context associated with the received textual information.

At 502, textual information may be received. The circuitry 202 may be further configured to receive textual information including information related to the emoji. The textual information may be a message in the form of a text that the first user 112 may wish to send to the second user 114. For example, the textual information may be an email, a chat to be sent in a chat box, and the like.

In an embodiment, the received textual information may correspond to at least one of an email message, a text message, a closed-captioned text, or a sub-title text. The email message may correspond to a message sent via an email. The text message may correspond to a short messaging service (SMS) text. The closed-captioned text may include textual information comprising words spoken and background sound in a media content. The sub-title text may include words spoken in the media content.

At 504, a natural language processing (NLP) model may be applied. The circuitry 202 may be further configured to apply the natural language processing (NLP) model (e.g., the NLP model 214) on the received textual information. It may be appreciated that the natural language processing (NLP) model may be a branch of artificial intelligence that may process human-written languages to determine a context of the text to perform operations such as, a spell check, a grammatical check, translations, and the like on the human written language. The NLP model 214 may employ syntactic analysis and semantic analysis operations on an input text (e.g., the received textual information). The syntactic analysis may analyze a syntax of the received textual information to determine a structure of sentences of the received textual information to determine the context. The semantic analysis may obtain a semantic meaning of the received textual information based on a determination of a meaning of each word and a determination of a meaning of a combination of words in the received textual information.

At 506, the context associated with the received textual information may be determined. The circuitry 202 may be further configured to determine a context associated with the received textual information based on the application of the NLP model 214 on the received textual information. The context may be an essence (or a semantic meaning) of the received textual information. In other words, the context may refer to what the first user 112 may intend to say, which may be determined based on the received textual information. For example, the context may be happy, sad, excited, surprised, and the like.

At 508, the set of texts may be determined. The circuitry 202 may be further configured to determine the set of texts associated with the emoji based on the determined context associated with the received textual information. Instead of determining the set of texts based on a user input, the circuitry 202 may determine the set of texts based on the determined context. For example, if the context associated with the received textual information is determined as "John is happy", the set of texts may be determined as "John" and "happy", where "John" may be the person to which the emoji may be directed and "happy" may be the meaning of the emoji. In this way, a user intervention for the determination of the set of texts associated with the emoji may be minimized.

FIG. 6 is a diagram that illustrates an exemplary scenario of a set of defined locations for determination of the generated text-enhanced icon, in accordance with an embodiment of the disclosure. FIG. 6 is described in conjunction with elements from FIG. 1, FIG. 2, FIG. 3, FIG. 4, and FIG. 5. With reference to FIG. 6, there is shown a scenario 600. The scenario 600 may include a determined graphical icon 602. The determined graphical icon 602 may have a "Zone 1" 604, a "Zone 2" 606, a "Zone 3" 608, a "Zone 4" 610, a "Zone 5" 612, a "Zone 6" 614, a "Zone 7" 616, a "Zone 8" 618, a "Zone 9" 620, a "Zone 10" 622, and a "Zone 11" 624. A set of operations associated the scenario 600 is described herein.

The circuitry 202 may be configured to generate the text-enhanced icon based on the determined graphical icon and the determined set of texts. The generated text-enhanced icon may include the determined set of texts positioned at the set of defined locations associated with the determined graphical icon. For example, with reference to FIG. 6, the set of defined locations may be the "Zone 1" 604, the "Zone 2" 606, the "Zone 3" 608, the "Zone 4" 610, the "Zone 5" 612, the "Zone 6" 614, the "Zone 7" 616, the "Zone 8" 618, the "Zone 9" 620, the "Zone 10" 622, and the "Zone 11" 624. The "Zone 1" 604 and the "Zone 2" 606 may be the second locations that may lie at the right-outer region of the determined graphical icon 602. The "Zone 3" 608 and the "Zone 4" 610 may be the first locations that may lie at the left-outer region of the determined graphical icon 602. The "Zone 5" 612 may be the fourth location that may lie at the bottom-outer region of the determined graphical icon 602. The "Zone 6" 614 may be the third location that may lie at the top-outer region of the determined graphical icon 602. The "Zone 7" 616, the "Zone 8" 618, the "Zone 9" 620, the "Zone 10" 622, and the "Zone 11" 624 may be the fifth locations that may lie at the internal region of the determined graphical icon 602. Also, the "Zone 1" 604, the "Zone 2" 606, the "Zone 3" 608, the "Zone 4" 610 may be arranged "in-line" with the emoji. In an embodiment, the "Zone 1" 604, the "Zone 2" 606, the "Zone 3" 608, and the "Zone 4" 610 may be used to position the determined set of texts at the aforesaid zones may not alter the determined graphical icon 602.

In an example, one or more of: the "Zone 1" 604, the "Zone 2" 606, the "Zone 3" 608, and the "Zone 4" 610 may be selected as the set of defined locations based on a direction of language (for example, left-to-right in case of English, and right-to-left in case of Arabic). The determined set of texts may be positioned at the selected zones along with the determined graphical icon 602 in the generated text-enhanced icon, before or after the determined graphical icon 602. The "Zone 1" 604, the "Zone 2" 606, the "Zone 3" 608, and the "Zone 4" 610 may be easier to support with slight modifications to existing applications because such zones may be rendered serially. It may be noted that when the text is positioned at one of the "Zone 5" 612, the "Zone 6" 614, the "Zone 7" 616, the "Zone 8" 618, the "Zone 9" 620, the "Zone 10" 622, and the "Zone 11" 624, a vertical size of the determined graphical icon 602 may be altered such that an allocated screen space of the determined graphical icon 602 may be changed. It should be noted that the scenario 600 of FIG. 6 is for exemplary purposes and should not be construed to limit the scope of the disclosure.

Figure 7:
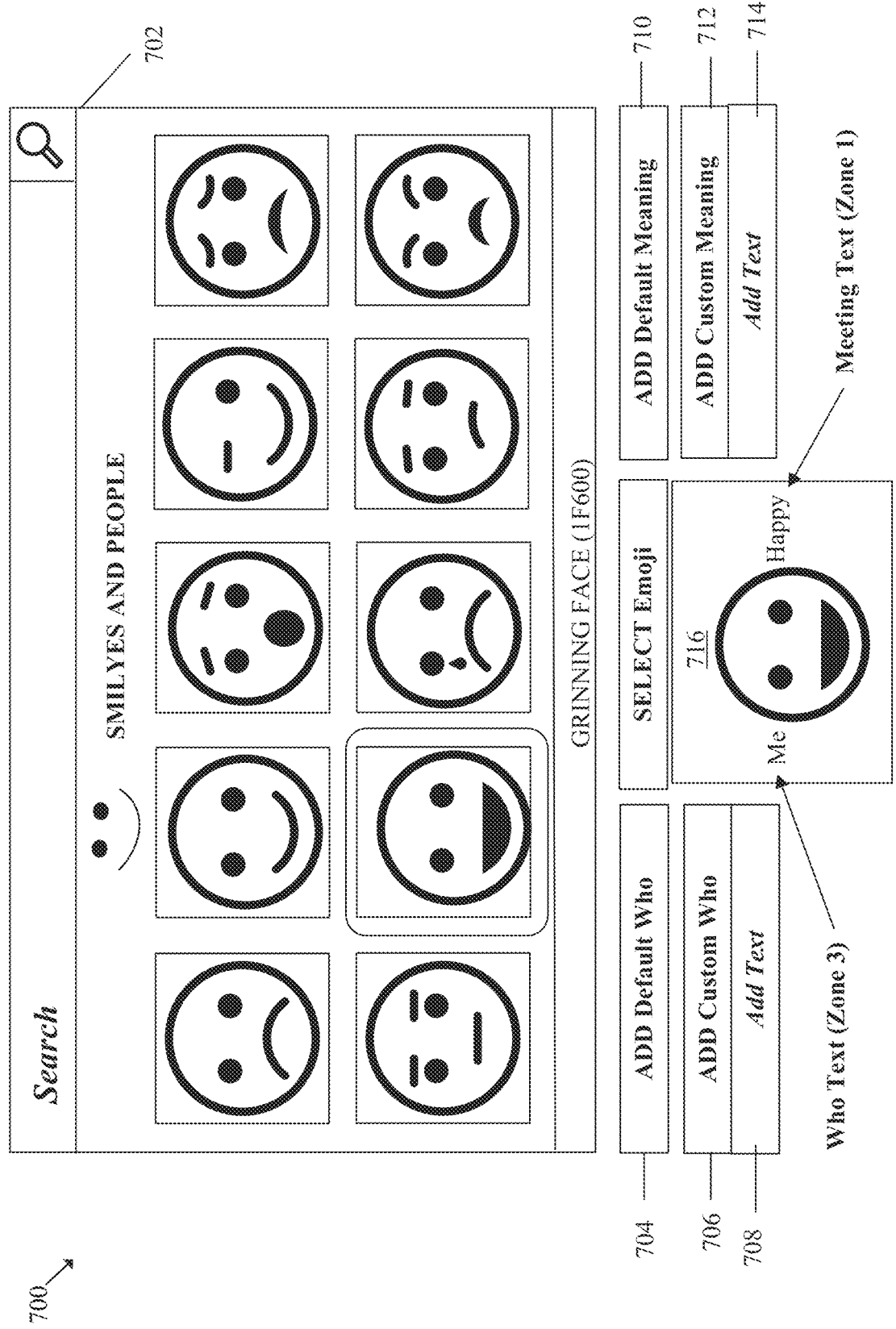
FIG. 7 is a diagram that illustrates an exemplary scenario for reception of an emoji based on a user input, in accordance with an embodiment of the disclosure.

FIG. 7 is a diagram that illustrates an exemplary scenario for reception of an emoji based on a user input, in accordance with an embodiment of the disclosure. FIG. 7 is described in conjunction with elements from FIG. 1, FIG. 2, FIG. 3, FIG. 4, FIG. 5, and FIG. 6. With reference to FIG.

7, there is shown an exemplary scenario 700. The scenario 700 may include a user interface (UI) 702, a first UI element 704, a second UI element 706, a third UI element 708, a fourth UI element 710, a fifth UI element 712, a sixth UI element 714, and a text-enhanced icon 716. A set of operations associated the scenario 700 is described herein.

The circuitry 202 may be configured to receive the emoji based on a user input indicative of a selection of the emoji from a plurality of emojis. The first user 112 may select the emoji on the user interface (UI) 702. With reference to FIG. 7, a grinning face emoji may be selected. Next, the set of texts associated with the emoji may be determined. In an embodiment, the first UI element 704 to add a "Default Who" (i.e., a default person) associated with the emoji may be selected. The "Default Who" may be a name of the person associated with the first electronic device 102, a default name of the first electronic device 102, and the like. In an alternative embodiment, the first user 112 may select the second UI element 706 to add a "Custom Who" associated with the emoji. The first user 112 may add information about the person associated with the emoji in the third UI element 708. For example, the first user 112 may add text "me" as the information about the person associated with the emoji in the third UI element 708. Further, a meaning associated with the emoji may be positioned. In an embodiment, the fourth UI element 710 may be selected to add a default meaning of the emoji that may provide a choice of popular meanings for the emoji, out of which one of the meanings may be selected. For example, the default meaning may be grinning, sad, angry, and the like. In an alternative embodiment, the first user 112 may select the fifth UI element 712 to add a "Custom Meaning" of the emoji. The first user 112 may add what he/she means by the emoji in the sixth UI element 714. For example, the custom meaning "happy" may be added in the sixth UI element 714. Finally, the text-enhanced icon 716 may be generated such that the person "me" is positioned at the "Zone 3" and the meaning "happy" is positioned at the "Zone 1" of the emoji. It may be noted that the uncertainty may be represented as "?" or "??" in "Zone 2" or may be simply added to the end of any custom text in "Zone 1". It may be further noted that the determined set of texts may be smaller or larger than that shown in FIG. 7, and may have a different font, and/or may even have different locations. It should be noted that scenario 700 of FIG. 7 is for exemplary purposes and should not be construed to limit the scope of the disclosure.

Figure 8A:
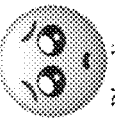
Figure 8A:
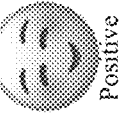
Figure 8A:
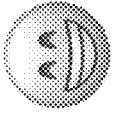
Figure 8A:
Figure 8A:
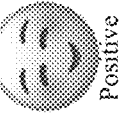
Figure 8A:
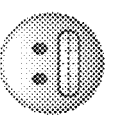
Figure 8A:
Figure 8A:
Figure 8A:
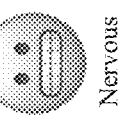
Figure 8A:

FIGS. 8A and 8B are tables that illustrate an exemplary scenario for generation of text-enhanced icons, in accordance with an embodiment of the disclosure. FIG. 8A and FIG. 8B are described in conjunction with elements from FIG. 1, FIG. 2, FIG. 3, FIG. 4, FIG. 5, FIG. 6, and FIG. 7. With reference to FIGS. 8A and 8B, there are shown exemplary tables 800A and 800B, respectively, of an exemplary scenario for generation of text-enhanced icons. The exemplary tables 800A and 800B may depict a plurality of graphical icons along with corresponding generated text-enhanced icons.

Each graphical icon of the plurality of graphical icons may be considered as an input emoji to the platform. Each emoji may be associated with an emoji name, such as, a face with pleading eyes, a grinning face with smiling eyes, a smiling face, a grinning face with star eyes, a grimacing face, a relieved face, a smiling face with open mouth and cold sweat, a face with one eyebrow raised, a smiling face with smiling eyes and three hearts, and a smiling face with open mouth, and tightly closed eyes with corresponding meaning. For example, the face with pleading eyes may mean pleading, the grinning face with smiling eyes may mean amused, smiling face may mean gratified, or positive feelings or impressive and the like. In another example, the meaning of the emoji may be positioned at "Zone 5" of the corresponding graphical icon to generate the corresponding text-enhanced icon. For example, the meaning "pleading" may be positioned at the "Zone 5" or the fourth location of the face with pleading eyes.

It should be noted that the values in the tables 800A and 800B of FIGS. 8A and 8B, respectively, are for exemplary purposes and should not be construed to limit the scope of the disclosure.

Figure 9A:
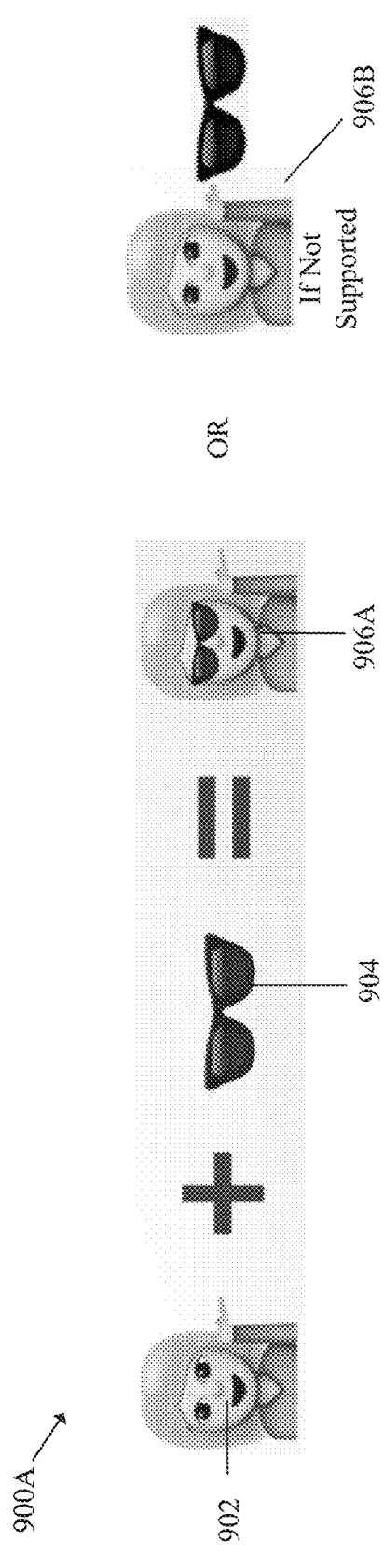
FIGS. 9A and 9B are diagrams that illustrate exemplary scenarios of Unicode emoji sequences of emojis, in accordance with an embodiment of the disclosure.
Figure 9B:
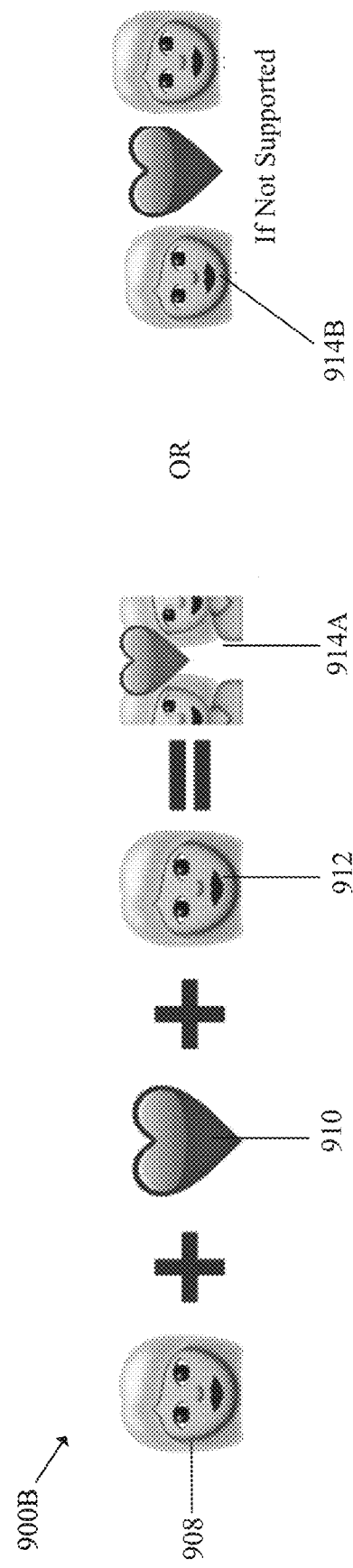

FIGS. 9A and 9B are diagrams that illustrate exemplary scenarios of Unicode emoji sequences of emojis, in accordance with an embodiment of the disclosure. FIG. 9A and FIG. 9B are described in conjunction with elements from FIG. 1, FIG. 2, FIG. 3, FIG. 4, FIG. 5, FIG. 6, FIG. 7, FIG. 8A, and FIG. 8B. With reference to FIGS. 9A and 9B, there are shown exemplary scenarios 900A and 900B, respectively, of Unicode emoji sequences of emojis. The scenario 900A may include a first emoji 902, a second emoji 904, a first glyph 906A, and a first set of glyphs 906B. The scenario 900B may include a first emoji 908, a second emoji 910, a third emoji 912, a second glyph 914A, and a second set of glyphs 914B.

For example, with reference to FIG. 9A, the first emoji 902 may represent a face of a lady and the second emoji 904 may represent sunglasses. The circuitry 202 may be configured to combine the first emoji 902 and the second emoji 904 to determine a single glyph, such as, the first glyph 906A, which may represent a face of a lady who may wear sunglasses. In an embodiment, the first glyph 906A may be determined by use of a Zero-Width Joiner (ZWJ) sequence, which may be defined as a Unicode sequence, such as, "U+200D". In case, an icon representative of the single glyph (i.e., the first glyph 906A) is unavailable or not supported by the first electronic device 102, the ZWJ sequence may be ignored and a fallback sequence of separate glyphs corresponding to the first emoji 902 and the second emoji 904 may be determined. For example, the fallback sequence may correspond to the first set of glyphs 906B.

In an example, with reference to FIG. 9B, the first emoji 908 may represent a first lady, the second emoji 910 may represent a heart or love emoji, and the third emoji 912 may represent a second lady. The circuitry 202 may be configured to combine the first emoji 908, the second emoji 910, and the third emoji 912 to determine a single glyph, such as, the second glyph 914A, which may represent love or affection between the first lady and the second lady. In an embodiment, the first glyph 906A may be determined by use of the Zero-Width Joiner (ZWJ) sequence, which may be defined as the Unicode sequence, such as, "U+200D". In case, the single glyph (i.e., the second glyph 914A) is unavailable or not supported, the ZWJ sequence may be ignored and a fallback sequence of separate glyphs corresponding to the first emoji 908, the second emoji 910, and the third emoji 912 may be determined. For example, the fallback sequence may correspond to the second set of glyphs 914B. It should be noted that the scenarios 900A and 900B of FIGS. 9A and 9B, respectively, are for exemplary purpose and should not be construed to limit the scope of the disclosure.

Figure 10A:
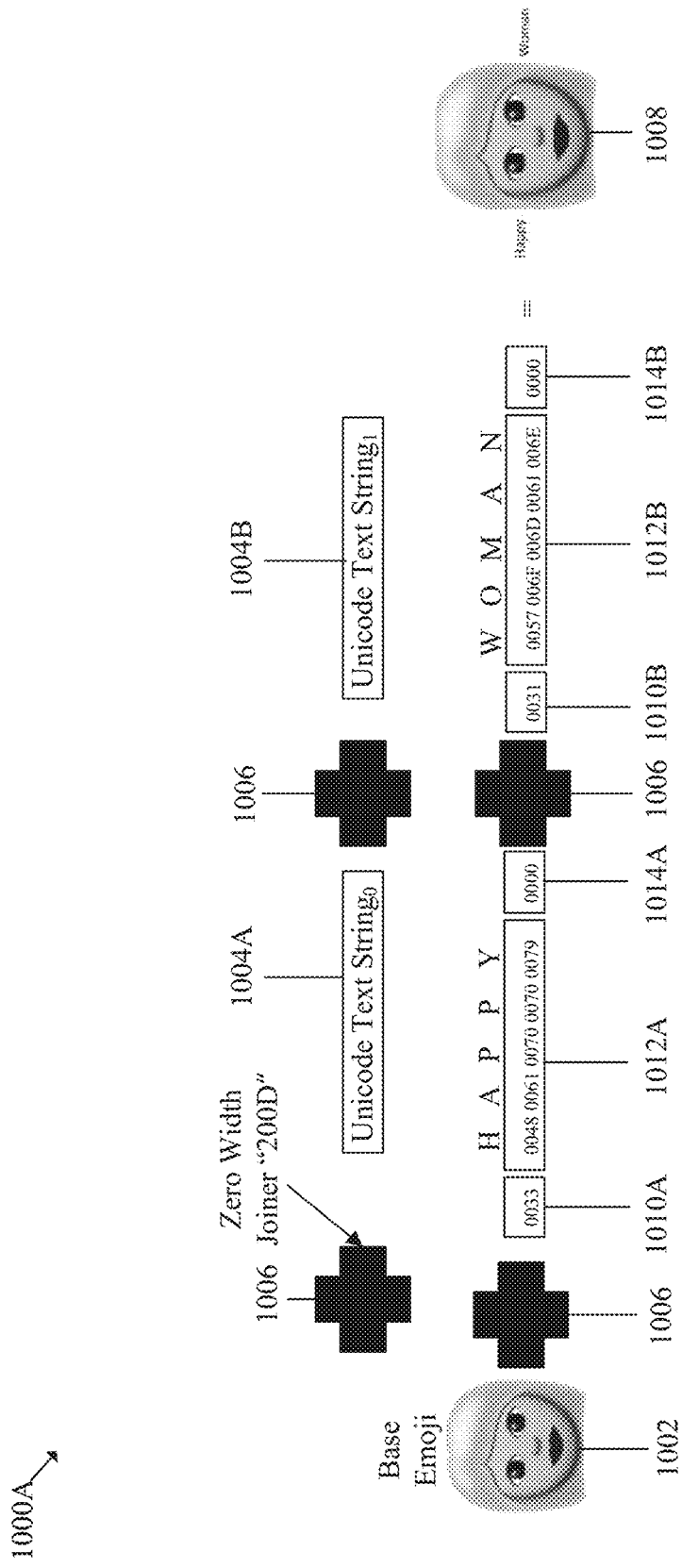
FIGS. 10A and 10B are diagrams that illustrate exemplary scenarios of Unicode emoji sequences and associated text-enhanced icons, in accordance with an embodiment of the disclosure.
Figure 10B:
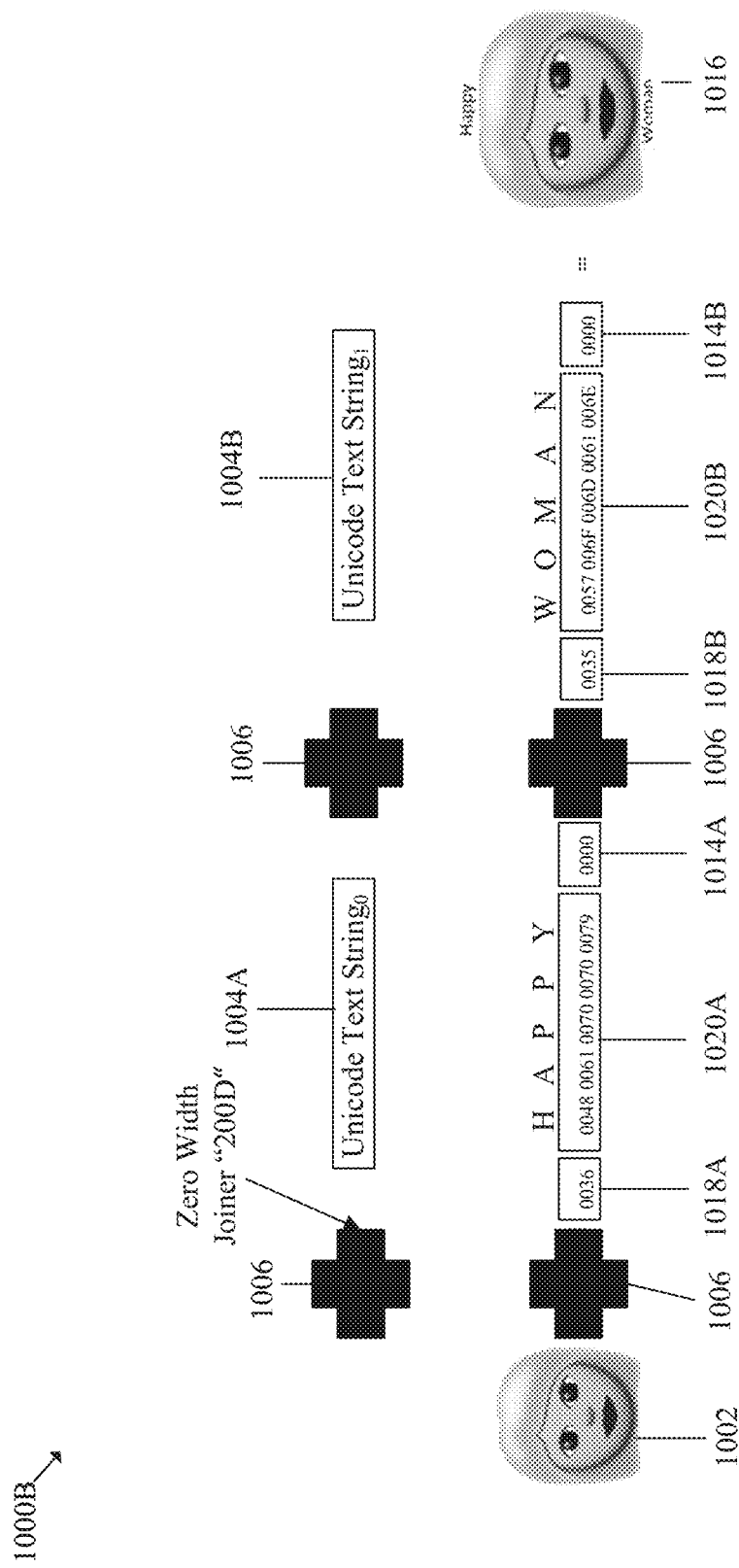

FIGS. 10A and 10B are diagrams that illustrate exemplary scenarios of Unicode emoji sequences and associated text-enhanced icons, in accordance with an embodiment of the disclosure. FIG. 10A and FIG. 10B are described in conjunction with elements from FIG. 1, FIG. 2, FIG. 3, FIG. 4, FIG. 5, FIG. 6, FIG. 7, FIG. 8A, FIG. 8B, FIG. 9A, and FIG. 9B. With reference to FIGS. 10A and 10B there are shown exemplary scenarios 1000A and 1000B, respectively, of Unicode emoji sequences and associated text-enhanced icons. The scenario 1000A may include a base emoji 1002, a first Unicode text 1004A, a second Unicode text 1004B, a joiner character 1006, and a first text-enhanced icon 1008. The scenario 1000B may include the base emoji 1002, the first Unicode text 1004A, the second Unicode text 1004B, the joiner character 1006, and a second text-enhanced icon 1016.

For example, with reference to FIGS. 10A and 10B, the base emoji 1002 may represent a face of a lady. In an embodiment, the joiner character 1006 may be an invisible character, such as, a Zero-Width Joiner (ZWJ) sequence, which may be defined by a Unicode sequence, such as, "U+200D". The ZWJ sequence may allow a concatenation of a number of emojis that a platform may render as one glyph. The circuitry 202 may use the joiner character 1006 to combine the base emoji 1002 with textual characters associated with the first Unicode text 1004A and the second Unicode text 1004B to form the first text-enhanced icon 1008 (FIG. 10A) or the second text-enhanced icon 1016 (FIG. 10B). For example, in case of the scenarios 1000A and 1000B, the textual characters associated with the first Unicode text 1004A and the second Unicode text 1004B may correspond to the words "Happy" and "Woman", respectively.

With reference to the scenario 1000A of FIG. 10A, the first Unicode text 1004A may include a first position indicator character 1010A (such as, "0033") that may represent the "Zone 3" 608 (as shown in FIG. 6). The first Unicode text 1004A may further include a first textual sequence 1012A (such as, "0048 0061 0070 0070 0079") that may represent Unicode values (or ASCII codes) associated with the text "Happy". Further, the first textual sequence 1012A may be followed by a Unicode string terminator character 1014A (such as, "0000"). Further, the second Unicode text 1004B may include a second position indicator character 1010B (such as, "0031") that may represent the "Zone 1" 604 (shown in FIG. 6). The second Unicode text 1004B may further include a second textual sequence 1012B (such as, "0057 006F 006D 0061 006E") that may represent Unicode values (or ASCII codes) associated with the text "Woman". Further, the second textual sequence 1012B may be followed by a Unicode string terminator character 1014B (such as, "0000"). Based on the combination of the base emoji 1002, the first Unicode text 1004A, the second Unicode text 1004B, and the joiner character 1006, the circuitry 202 may determine the first text-enhanced icon 1008. For example, the text "Happy" may be positioned at the "Zone 3" 608 and the text "Woman" may be positioned at the "Zone 1" 604 associated with the base emoji 1002 in the first text-enhanced icon 1008, as shown in FIG. 10A.

With reference to the scenario 1000B of FIG. 10B, the first Unicode text 1004A may include a first position indicator character 1018A (such as, "0036") that may represent the "Zone 6" 614 (as shown in FIG. 6). The first Unicode text 1004A may further include a first textual sequence 1020A (such as, "0048 0061 0070 0070 0079") that may represent Unicode values (or ASCII codes) associated with the text "Happy". Further, the first textual sequence 1020A may be followed by a Unicode string terminator character 1014A (such as, "0000"). Further, the second Unicode text 1004B may include a second position indicator character 1018B (such as, "0035") that may represent the "Zone 5" 612 (as shown in FIG. 6). The second Unicode text 1004B may further include a second textual sequence 1020B (such as, "0057 00 6F 006D 0061 006E") that may represent Unicode values (or ASCII codes) associated with the text "Woman". Further, the second textual sequence 1012B may be followed by a Unicode string terminator character 1014B (such as, "0000"). Based on the combination of the base emoji 1002, the first Unicode text 1004A, the second Unicode text 1004B, and the joiner character 1006, the circuitry 202 may determine the second text-enhanced icon 1016. The text "Happy" may be positioned at the "Zone 6" 614 and the text "Woman" may be positioned at the "Zone 5" 612 associated with the base emoji 1002 to determine the second text-enhanced icon 1016, as shown in FIG. 10B.

In an embodiment, the first character in a Unicode text string (e.g., the first Unicode text 1004A or the second Unicode text 1004B) may be a character that may represent a Zone number associated with the rest of the text in the Unicode text string. In case there are 2-character numbers in a row, then the first number may be a "1" character and the second number may be either a "0" or "1" to represent Zones "10" or "11". The rest of the characters may correspond to a word or emotion associated with the emoji. The character numbers that may represent the Zone numbers may not be displayed, and may just indicate the zones where the rest of the characters may be positioned. Further, the Unicode text strings (e.g., the first Unicode text 1004A or the second Unicode text 1004B) may include more text strings to support more zones associated with text-enhanced icons (such as, the first text-enhanced icon 1008 and the second text-enhanced icon 1016). It should be noted that the scenarios 1000A and 1000B of FIGS. 10A and 10B, respectively, are for exemplary purpose and should not be construed to limit the scope of the disclosure.

Figure 11A:
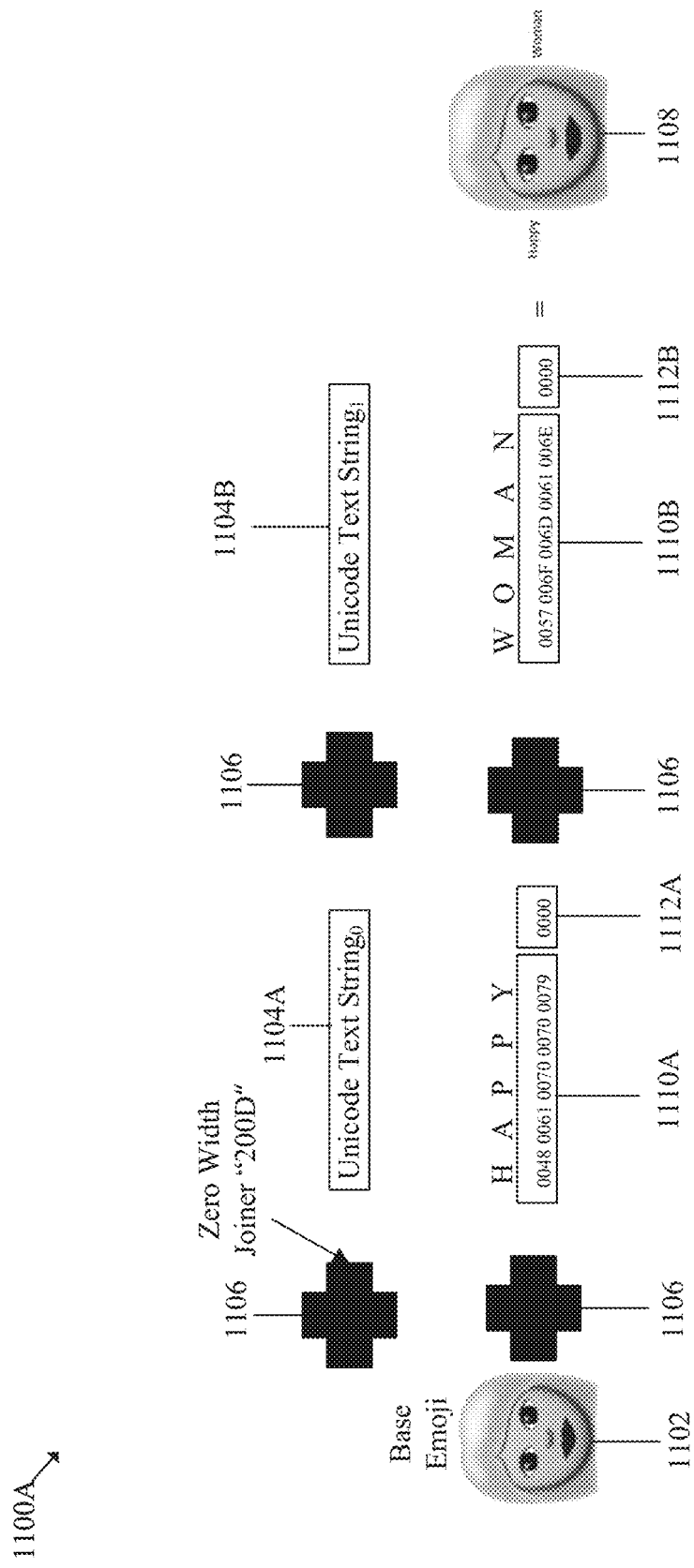
FIGS. 11A and 11B are diagrams that illustrate exemplary scenarios of Unicode emoji sequences and associated text-enhanced icons, in accordance with an embodiment of the disclosure.
Figure 11B:
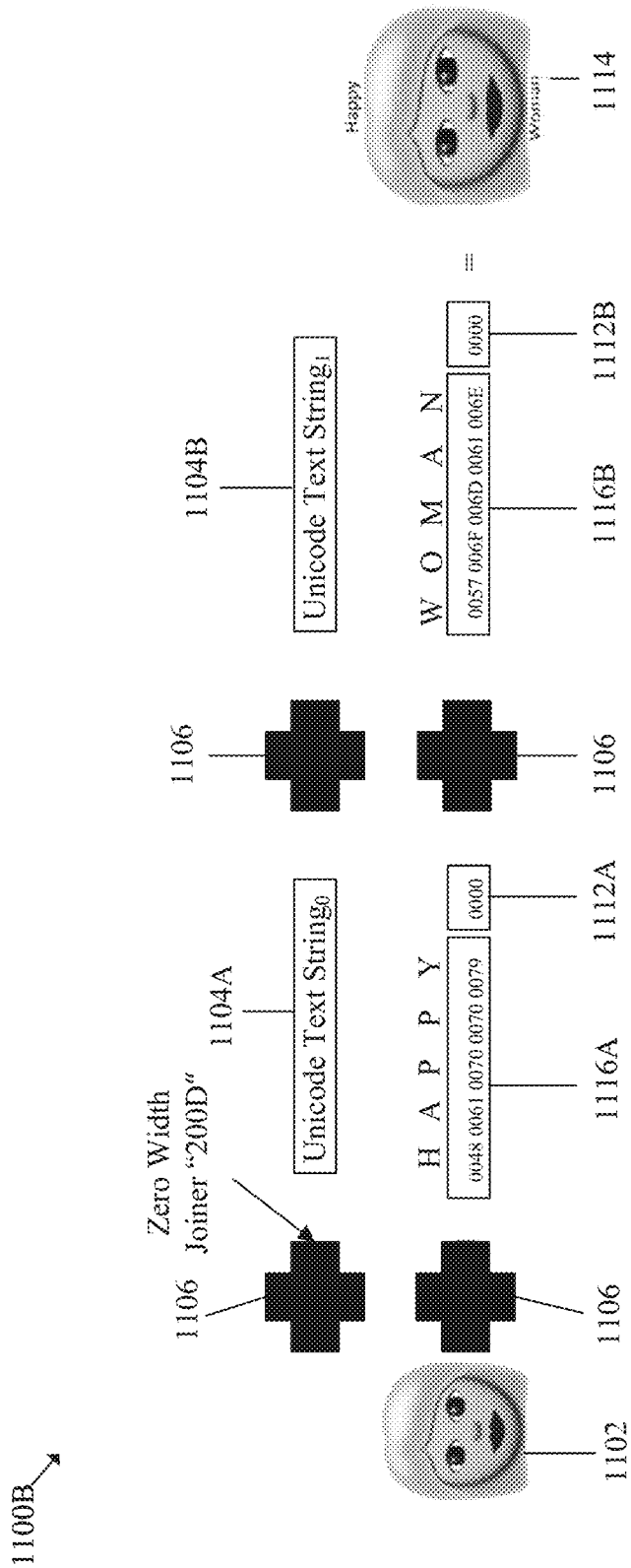

FIGS. 11A and 11B are diagrams that illustrate exemplary scenarios of Unicode emoji sequences and associated text-enhanced icons, in accordance with an embodiment of the disclosure. FIG. 11A and FIG. 11B are described in conjunction with elements from FIG. 1, FIG. 2, FIG. 3, FIG. 4, FIG. 5, FIG. 6, FIG. 7, FIG. 8A, FIG. 8B, FIG. 9A, FIG. 9B, FIG. 10A, and FIG. 10B. With reference to FIGS. 11A and 11B, there are shown exemplary scenarios 1100A and 1100B, respectively, of Unicode emoji sequences and associated text-enhanced icons. The scenario 1100A may include a base emoji 1102, a first Unicode text 1104A, a second Unicode text 1104B, a joiner character 1106, and a first text-enhanced icon 1108. The scenario 1100B may include the base emoji 1102, the first Unicode text 1104A, the second Unicode text 1104B, the joiner character 1106, and a second text-enhanced icon 1114.

For example, with reference to FIGS. 11A and 11B, the base emoji 1102 may represent a face of a lady. In an embodiment, the joiner character 1106 may be an invisible character, such as, a Zero-Width Joiner (ZWJ) sequence, which may be defined by a Unicode sequence, such as, "U+200D". The ZWJ sequence may allow a concatenation of a number of emojis that a platform may render as one glyph. The circuitry 202 may use the joiner character 1106 to combine the base emoji 1102 with textual characters associated with the first Unicode text 1104A and the second Unicode text 1104B to form the first text-enhanced icon 1108 (FIG. 11A) or the second text-enhanced icon 1116 (FIG. 11B). For example, in case of the scenarios 1100A and 1100B, the textual characters associated with the first Unicode text 1104A and the second Unicode text 1104B may correspond to the words "Happy" and "Woman", respectively.

With reference to the scenario 1100A of FIG. 11A, the first Unicode text 1104A may include a first textual sequence 1110A (such as, "0048 0061 0070 0070 0079") that may represent Unicode values associated with the text "Happy". Further, the first textual sequence 1110A may be followed by a Unicode string terminator character 1112A (such as, "0000"). The second Unicode text 1104B may include a second textual sequence 1110B (such as, "0057 006F 006D 0061 006E") that may represent Unicode values associated with the text "Woman". Further, the second textual sequence 1110B may be followed by a Unicode string terminator character 1112B (such as, "0000"). Based on the combination of the base emoji 1102, the first Unicode text 1104A, the second Unicode text 1104B, and the joiner character 1106, the circuitry 202 may determine the first text-enhanced icon 1108. In the current scenario 1100A, the text "Happy" and the text "Woman" may be positioned at predefined positions associated with the first text-enhanced icon 1108. The predefined positions may not be defined within the first textual sequence 1110A or the second textual sequence 1110B. For example, the text "Happy" may be positioned at the "Zone 3" 608 and the text "Woman" may be positioned at the "Zone 1" 604 associated with the base emoji 1102 in the first text-enhanced icon 1108, as shown in FIG. 11A.

With reference to the scenario 1100B of FIG. 11B, the first Unicode text 1104A may include a first textual sequence 1116A (such as, "0048 0061 0070 0070 0079") that may represent Unicode values associated with the text "Happy". Further, the first textual sequence 1116A may be followed by a Unicode string terminator character 1112A (such as, "0000"). The second Unicode text 1104B may include a second textual sequence 1116B (such as, "0057 006F 006D 0061 006E") that may represent Unicode values associated with the text "Woman". Further, the second textual sequence 1116B may be followed by a Unicode string terminator character 1112B (such as, "0000"). Based on the combination of the base emoji 1102, the first Unicode text 1104A, the second Unicode text 1104B, and the joiner character 1106, the circuitry 202 may determine the second text-enhanced icon 1114. In the current scenario 1100B, the text "Happy" and the text "Woman" may be positioned at predefined positions associated with the second text-enhanced icon 1114. The predefined positions may not be defined within the first textual sequence 1116A or the second textual sequence 1116B. For example, the text "Happy" may be positioned at the "Zone 6" 614 and the text "Woman" may be positioned at the "Zone 6" 612 associated with the base emoji 1102 in the second text-enhanced icon 1114, as shown in FIG. 11B. It should be noted that the scenarios 1100A and 1100B of FIGS. 11A and 11B, respectively, are for exemplary purpose and should not be construed to limit the scope of the disclosure.

Figure 12A:
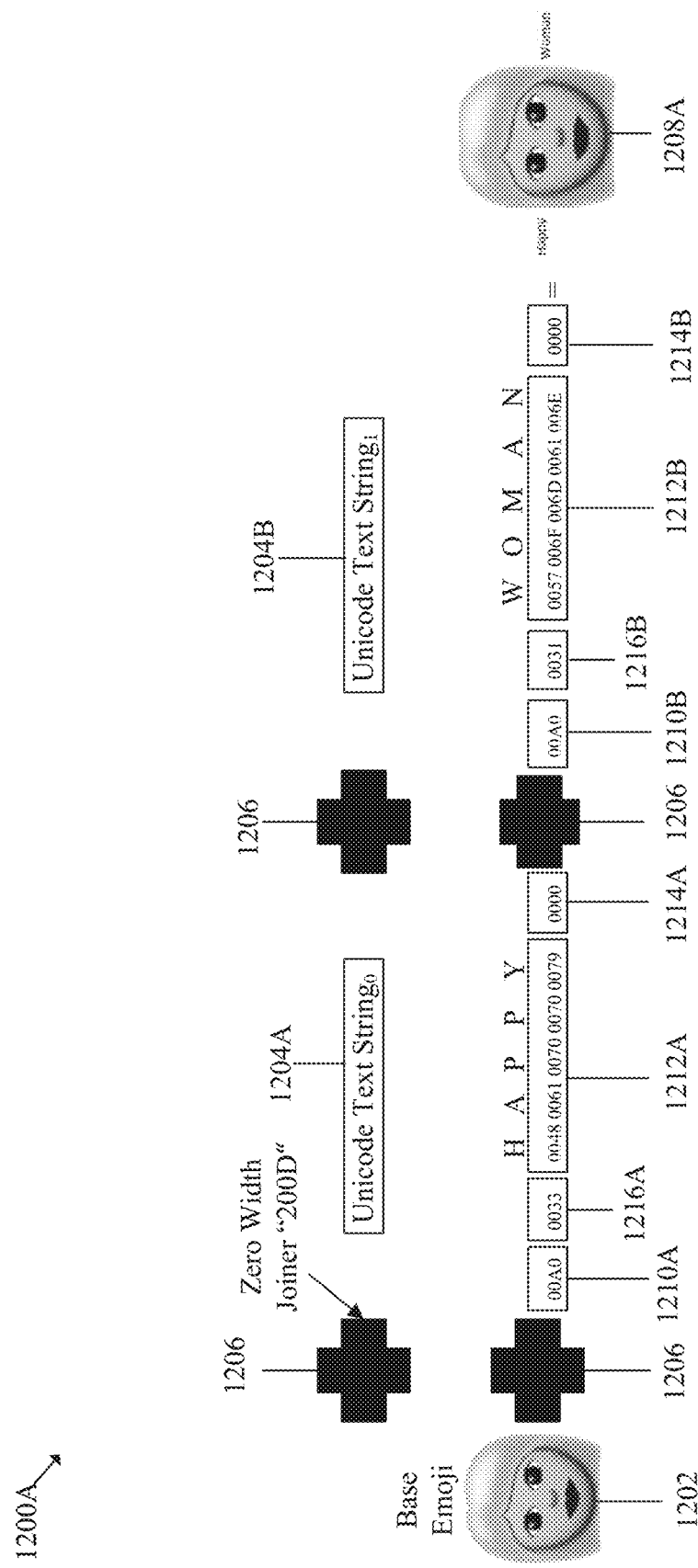
FIGS. 12A and 12B are diagrams that illustrate exemplary scenarios of Unicode emoji sequences and associated text-enhanced icons, in accordance with an embodiment of the disclosure.
Figure 12B:
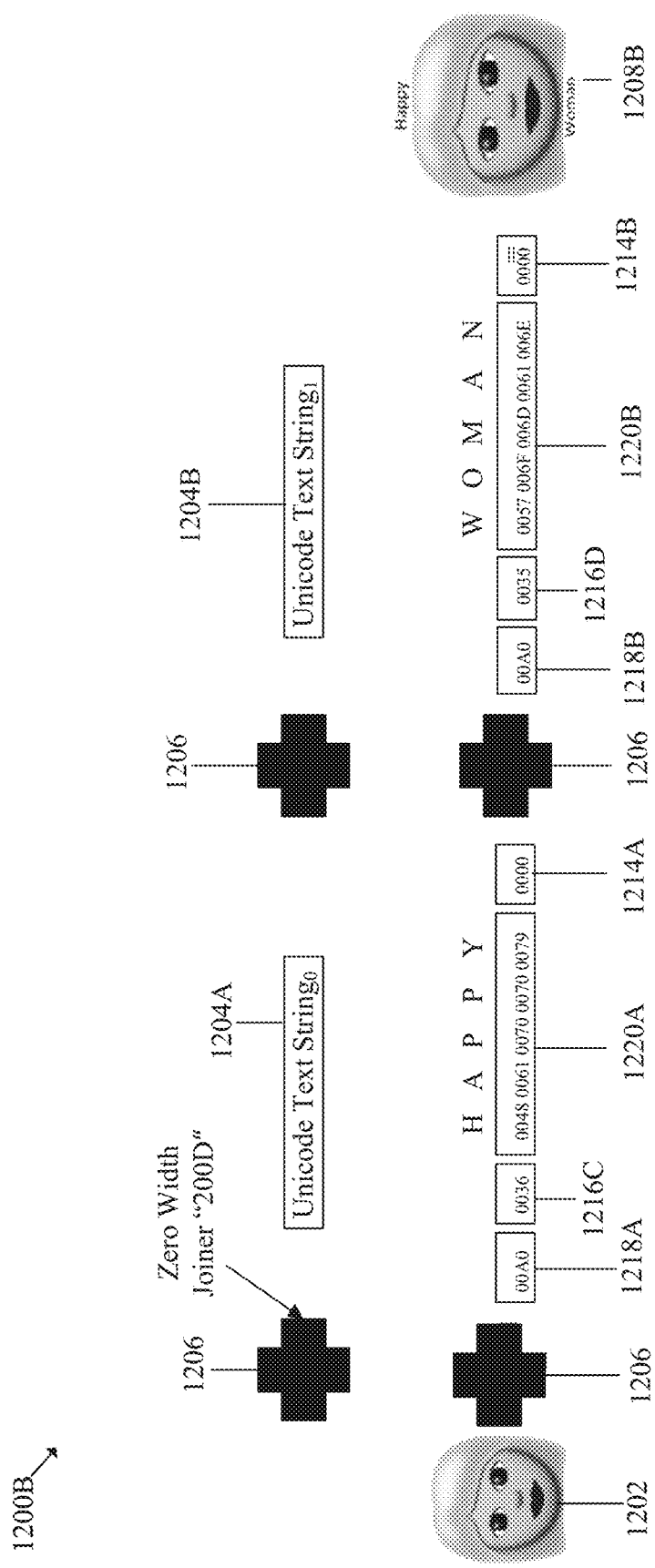

FIGS. 12A and 12B are diagrams that illustrate exemplary scenarios of Unicode emoji sequences and associated text-enhanced icons, in accordance with an embodiment of the disclosure. FIG. 12A and FIG. 12B are described in conjunction with elements from FIG. 1, FIG. 2, FIG. 3, FIG. 4, FIG. 5, FIG. 6, FIG. 7, FIG. 8A, FIG. 8B, FIG. 9A, FIG. 9B, FIG. 10A, FIG. 10B, FIG. 11A, and FIG. 11B. With reference to FIGS. 12A and 12B, there are shown exemplary scenarios 1200A and 1200B, respectively, of Unicode emoji sequences and associated text-enhanced icons. The scenario 1200A may include a base emoji 1202, a first Unicode text 1204A, a second Unicode text 1204B, a joiner character 1206, and a first text-enhanced icon 1208A. The scenario 1200B may include the base emoji 1202, the first Unicode text 1204A, the second Unicode text 1204B, the joiner character 1206, and a second text-enhanced icon 1208B.

For example, with reference to FIGS. 12A and 12B, the base emoji 1202 may represent a face of a lady. In an embodiment, the joiner character 1206 may be an invisible character, such as, a Zero-Width Joiner (ZWJ) sequence, which may be defined by a Unicode sequence, such as, "U+200D". The ZWJ sequence may allow a concatenation of a number of emojis that a platform may render as one glyph. The circuitry 202 may use the joiner character 1206 to combine the base emoji 1202 with textual characters associated with the first Unicode text 1204A and the second Unicode text 1204B to form the first text-enhanced icon 1208A (FIG. 12A) or the second text-enhanced icon 1208B (FIG. 12B). For example, in case of the scenarios 1200A and 1200B, the textual characters associated with the first Unicode text 1204A and the second Unicode text 1204B may correspond to the words "Happy" and "Woman", respectively.

With reference to the scenario 1200A of FIG. 12A, the first Unicode text 1204A may start with a sequence text identifier character 1210A (such as, "00A0"), which may be a non-printable and non-displayable character. The sequence text identifier character 1210A indicates that the characters that follow the sequence text identifier character 1210A in the first Unicode text 1204A may correspond to a Unicode text string, which may be required to be interpreted accordingly. The first Unicode text 1204A may further include a first position indicator character 1216A (such as, "0033") that may represent the "Zone 3" 608. The first Unicode text 1204A may further include a first textual sequence 1212A (such as, "0048 0061 0070 0070 0079") that may represent Unicode values associated with the text "Happy". Further, the first textual sequence 1212A may be followed by a Unicode string terminator character 1214A (such as, "0000"). The second Unicode text 1204B may start with a sequence text identifier character 1210B (such as, "00A0"), which may be a non-printable and non-displayable character to indicate a Unicode text string, similar to the sequence text identifier character 1210A. Further, the second Unicode text 1204B may include a second position indicator character 1216B (such as, "0031") that may represent the "Zone 1" 604. The second Unicode text 1204B may further include a second textual sequence 1212B (such as, "0057 006F 006D 0061 006E") that may represent Unicode values associated with the text "Woman". Further, the second textual sequence 1212B may be followed by a Unicode string terminator character 1214B (such as, "0000"). Based on the combination of the base emoji 1202, the first Unicode text 1204A, the second Unicode text 1204B, and the joiner character 1206, the circuitry 202 may determine the first text-enhanced icon 1208A. For example, the text "Happy" may be positioned at the "Zone 3" 608 and the text "Woman" may be positioned at the "Zone 1" 604 associated with the base emoji 1202 in the first text-enhanced icon 1208A, as shown in FIG. 12A.

With reference to the scenario 1200B of FIG. 12B, the first Unicode text 1204A may start with a sequence text identifier character 1218A (such as, "00A0"), which may be a non-printable and non-displayable character. The sequence text identifier character 1218A indicate that the characters that follow the sequence text identifier character 1218A in the first Unicode text 1204A may correspond to a Unicode text string, which may be required to be interpreted accordingly. The first Unicode text 1204A may further include a third position indicator character 1216C (such as, "0033") that may represent the "Zone 6" 614. The first Unicode text 1204A may further include a first textual sequence 1220A (such as, "0048 0061 0070 0070 0079") that may represent Unicode values associated with the text "Happy". Further, the first textual sequence 1220A may be followed by a Unicode string terminator character 1214A (such as, "0000"). The second Unicode text 1204B may start with a sequence text identifier character 1218B (such as, "00A0"), which may be a non-printable and non-displayable character to indicate a Unicode text string, similar to the sequence text identifier character 1218A. Further, the second Unicode text 1204B may include a fourth position indicator character 1216D (such as, "0031") that may represent the "Zone 5" 612. The second Unicode text 1204B may further include a second textual sequence 1220B (such as, "0057 006F 006D 0061 006E") that may represent Unicode values associated with the text "Woman". Further, the second textual sequence 1220B may be followed by a Unicode string terminator character 1214B (such as, "0000"). Based on the combination of the base emoji 1202, the first Unicode text 1204A, the second Unicode text 1204B, and the joiner character 1206, the circuitry 202 may determine the second text-enhanced icon 1208B. For example, the text "Happy" may be positioned at the "Zone 6" 614 and the text "Woman" may be positioned at the "Zone 5" 612 associated with the base emoji 1202 in the second text-enhanced icon 1208B, as shown in FIG. 12B. It should be noted that the scenarios 1200A and 1200B of FIGS. 12A and 12B, respectively, are for exemplary purpose and should not be construed to limit the scope of the disclosure.

Figure 13:
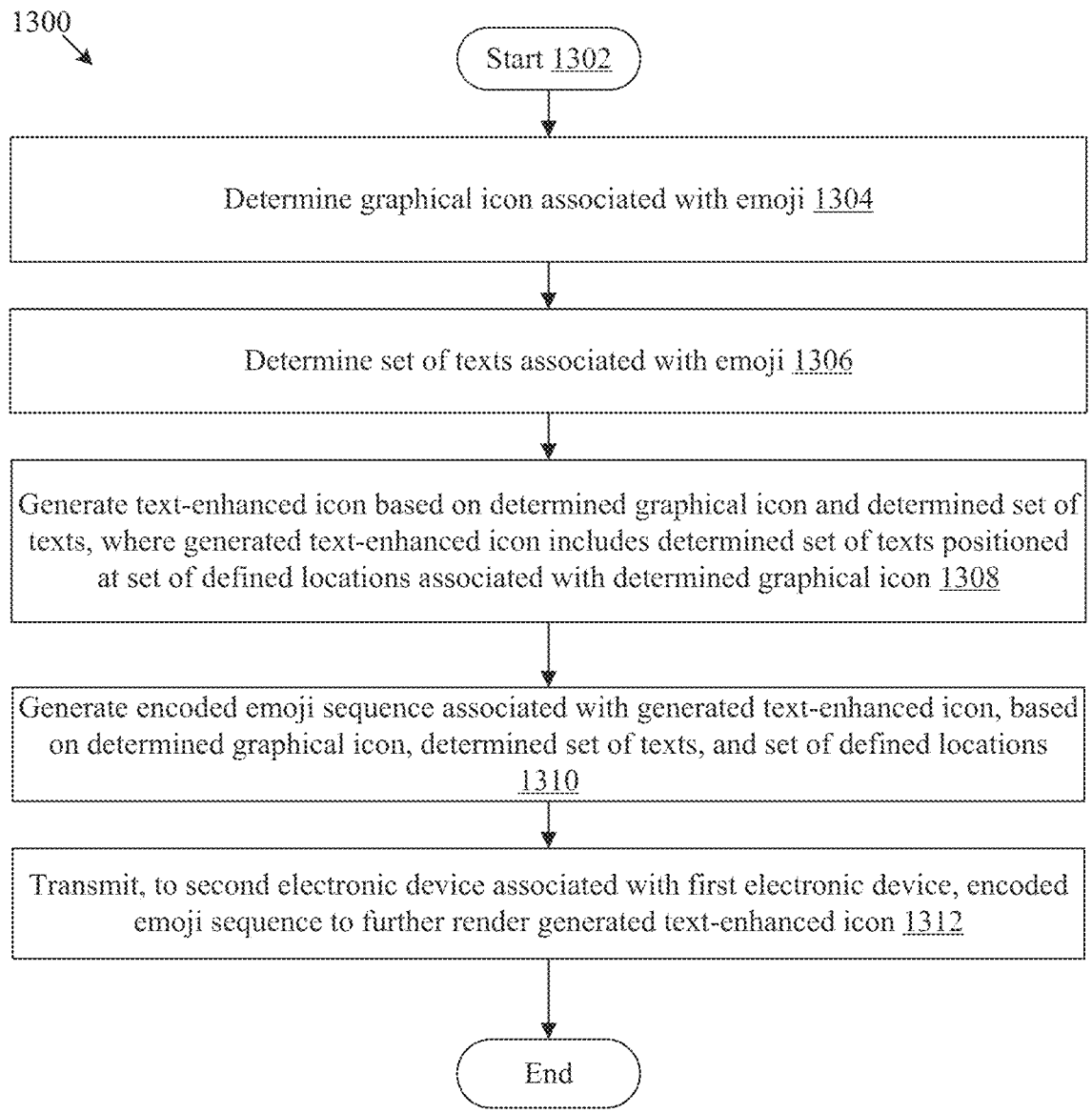
FIG. 13 is a flowchart that illustrates operations of an exemplary method for generation of the text-enhanced icon, in accordance with an embodiment of the disclosure.

FIG. 13 is a flowchart that illustrates operations of an exemplary method for generation of the text-enhanced icon, in accordance with an embodiment of the disclosure. FIG. 13 is described in conjunction with elements from FIG. 1, FIG. 2, FIG. 3, FIG. 4, FIG. 5, FIG. 6, FIG. 7, FIG. 8A, FIG. 8B, FIG. 9A, FIG. 9B, FIG. 10A, FIG. 10B, FIG. 11A, FIG. 11B, FIG. 12A, and FIG. 12B. With reference to FIG. 13, there is shown a flowchart 1300. The flowchart 1300 may include operations from 1302 to 1312 and may be implemented by the first electronic device 102 of FIG. 1 or by the circuitry 202 of FIG. 2. The flowchart 1300 may start at 1302 and proceed to 1304.

At 1304, the graphical icon associated with the emoji may be determined. The circuitry 202 may be configured to determine the graphical icon associated with the emoji. In an example, the emoji may be the image, or the icon used to represent an emotion such as, happy, sad, grinning, and the like. In an embodiment, the circuitry 202 may be configured to receive the emoji based on a user input provided by the first user 132 through the user interface provided on the display device 212 of the first electronic device 102. The user input may be sequence of characters associated with the emoji. In another embodiment, the emoji may be received based on the user input indicative of the selection of the emoji from a plurality of emojis. For example, the first user 132 may select the graphical icon associated with the emoji from the list of graphical icons displayed on the display device 212. Details related to the determination of the graphical icon are provided, for example, in FIG. 4.

At 1306, the set of texts associated with the emoji may be determined. The circuitry 202 may be configured to determine the set of texts associated with the emoji. The set of texts may help the second user 134 to understand the context, and/or the meaning of the emoji that may be sent by the first user 132. Details related to the determination of the set of texts are provided, for example, in FIGS. 4 and 5.

At 1308, the text-enhanced icon may be generated based on the determined graphical icon and the determined set of texts and the generated text-enhanced icon may include the determined set of texts positioned at a set of defined locations associated with the determined graphical icon. The circuitry 202 may be configured to generate the text-enhanced icon based on the determined graphical icon and the determined set of texts. In an embodiment, the generated text-enhanced icon may include the determined set of texts positioned at the set of defined locations associated with the determined graphical icon. The first electronic device 102 may insert the determined set of texts at the set of defined locations to generate the text-enhanced icon. The set of defined locations may be chosen such that the insertion of the determined set of texts at the set of defined locations may not alter a height, a width or a shape of the determined graphical icon. Details related to the set of defined locations are provided, for example, in FIG. 6.

At 1310, the encoded emoji sequence associated with the generated text-enhanced icon may be generated based on the determined graphical icon, the determined set of texts, and the set of defined locations. The circuitry 202 may be configured to generate the encoded emoji sequence associated with the generated text-enhanced icon, based on the determined graphical icon, the determined set of texts, and the set of defined locations. It may be appreciated that the encoded emoji sequence may help to encode the generated text-enhanced icon. The encoding may help to convert the generated text-enhanced icon into the form that may be transmitted and decoded at the receiver end. The encoded emoji sequence may correspond to the Unicode character sequence. Details related to the generation of the encoded emoji sequence are provided, for example, in FIG. 4 (at 408).

At 1312, the encoded emoji sequence may be transmitted to the second electronic device 104 associated with the first electronic device 102 to further render the generated text-enhanced icon. The circuitry 202 may be configured to transmit to the second electronic device 104 associated with the first electronic device 102, the encoded emoji sequence to further render the generated text-enhanced icon. The first electronic device 102 may transmit the encoded emoji sequence to the second electronic device 104, via the communication network 110. The second electronic device 104 may then display the generated text-enhanced icon on the display device 312 so that the second user 134 may understand on what the first user 132 means by the determined graphical icon. Details related to the transmission of the encoded emoji sequence are provided, for example, in FIG. 4 (at 410). Control may pass to end.

Although the flowchart 1300 is illustrated as discrete operations, such as, 1304, 1306, 1308, 1310, and 1312, the disclosure is not so limited. Accordingly, in certain embodiments, such discrete operations may be further divided into additional operations, combined into fewer operations, or eliminated, depending on the implementation without detracting from the essence of the disclosed embodiments.

Figure 14:
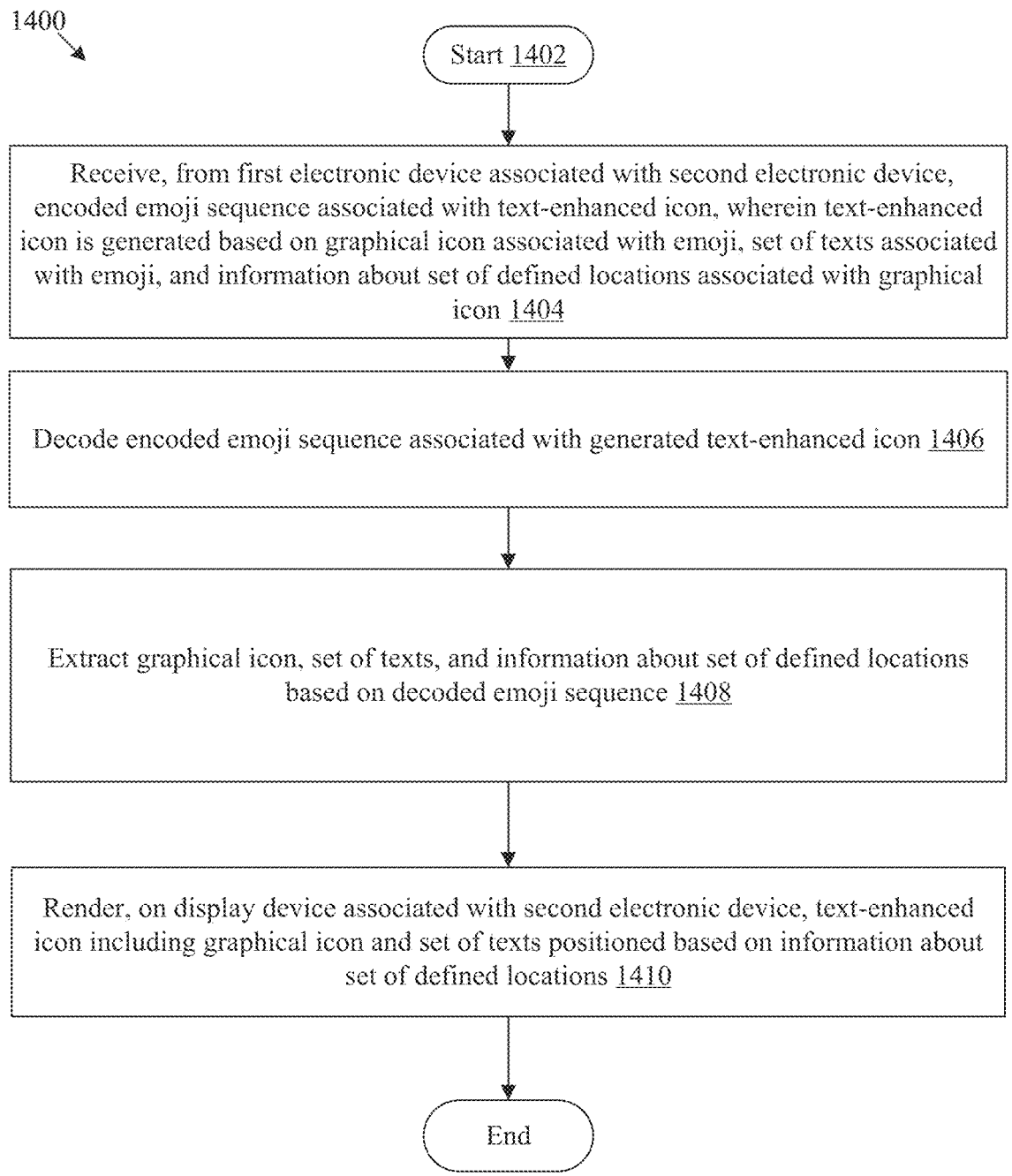
FIG. 14 is a flowchart that illustrates operations of an exemplary method to render the text-enhanced icon on the second electronic device, in accordance with an embodiment of the disclosure.

FIG. 14 is a flowchart that illustrates operations of an exemplary method to render the text-enhanced icon on the second electronic device, in accordance with an embodiment of the disclosure. FIG. 13 is described in conjunction with elements from FIG. 1, FIG. 2, FIG. 3, FIG. 4, FIG. 5, FIG. 6, FIG. 7, FIG. 8A, FIG. 8B, FIG. 9A, FIG. 9B, FIG. 10A, FIG. 10B, FIG. 11A, FIG. 11B, FIG. 12A, FIG. 12B, and FIG. 13. With reference to FIG. 14, there is shown a flowchart 1400. The flowchart 1400 may include operations from 1402 to 1410 and may be implemented by the second electronic device 104 of FIG. 1 or by the circuitry 302 of FIG. 3. The flowchart 1400 may start at 1402 and proceed to 1404.

At 1404, an encoded emoji sequence associated with a text-enhanced icon may be received from a first electronic device (for example, the first electronic device 102) associated with the second electronic device (for example, the second electronic device 104) and the text-enhanced icon may be generated based on a graphical icon associated with an emoji, a set of texts associated with the emoji, and information about a set of defined locations associated with the graphical icon. The circuitry 302 may be configured to receive, from the first electronic device 102 associated with the second electronic device 104, the encoded emoji sequence associated with the text-enhanced icon. In an embodiment, the text-enhanced icon may be generated based on the graphical icon associated with an emoji, the set of texts associated with the emoji, and information about the set of defined locations associated with the graphical icon. The encoded emoji sequence may be the Unicode character sequence of the generated text-enhanced icon. The text-enhanced icon may be generated based on positioning the set of texts associated with the emoji at the set of defined locations. Details related to the encoded emoji sequence and the generation of the text-enhanced icon are provided, for example, in FIG. 4.

At 1406, the encoded emoji sequence associated with the generated text-enhanced icon may be decoded. The circuitry 302 may be configured to decode the encoded emoji sequence associated with the generated text-enhanced icon. The decoding of the encoded emoji sequence associated with the generated text-enhanced icon may be executed to retrieve the generated text-enhanced icon. The decoding process may be an inverse of the encoding process. The decoding may convert the encoded emoji sequence into the generated text-enhanced icon. Details related to the decoding of the encoded emoji sequence are provided, for example, in FIG. 4 (at 414).

At 1408, the graphical icon, the set of texts, and the information about the set of defined locations may be extracted based on the decoded emoji sequence. The circuitry 302 may be configured to extract the graphical icon, the set of texts, and the information about the set of defined locations based on the decoded emoji sequence. The extraction may be performed on the decoded emoji sequence to separate the graphical icon (for example, the happy face emoji), the sets of texts (for example, the set of texts may be "happy" and "me"), and the information about the set of defined locations (for example, an indication that the set of defined locations may be "Zone 1" corresponding to the second location and "Zone 3" corresponding to the first location).

For example, with reference to FIG. 10A, from the decoded emoji sequence, the circuitry 302 may separate the base emoji 1002 (representative of a face of a lady), the first Unicode text 1004A, and the second Unicode text 1004B, based on the ZWJ sequence (i.e., the joiner character 1006) in the decoded emoji sequence. The circuitry 202 may determine that the first Unicode text 1004A may include the first position indicator character 1010A representative of "Zone 3" 608, followed by the first textual sequence 1012A representative of the Unicode or ASCII value associated with the text "Happy". Further, the circuitry 202 may determine that the second Unicode text 1004B may include the second position indicator character 1010B representative of "Zone 1" 604, followed by the first textual sequence 1012B representative of the Unicode or ASCII value associated with the text "Woman". Thus, in current scenario, the graphical icon may be extracted as the base emoji 1002 (representative of a face of a lady), the set of texts may be extracted as "Happy" and "Woman", and the set of defined locations may be extracted as "Zone 3" 608 and "Zone 1" 604. Based on the extracted graphical icon, the extracted set of texts, and the extracted set of defined locations, the circuitry 302 may automatically determine the text-enhanced icon, such as, the first text-enhanced icon 1008, as shown in FIG. 10A.

In an embodiment, the set of defined locations may be determined based on a user input from the second user 114. The set of defined locations may include at least one of: a first location at a left-outer region of the graphical icon, a second location at a right-outer region of the graphical icon, a third location at a top-outer region of the graphical icon, a fourth location at a bottom-outer region of the graphical icon, or a fifth location at an internal region of the graphical icon. The circuitry 302 may be configured to determine the set of defined locations based on the user input from the second user 114. The set of defined locations may be selected so as to not alter a shape, height, or width of the graphical icon. It may be noted that the first location at the left-outer region of the graphical icon and the second location at the right-outer region of the graphical icon may be suitable to position the set of texts that may not alter the graphical icon. However, the third location at the top-outer region of the graphical icon, the fourth location at the bottom-outer region of the graphical icon, or the fifth location at the internal region of the graphical icon may alter a vertical size of the graphical icon such that an allocated screen space of the graphical icon may be changed. It may be noted that color of the set of texts may be chosen according to a tone of the graphical icon such that the determined set of texts may be easily readable. The second user 114 may select the set of defined locations at which the set of texts may be positioned. The selected set of defined locations may be different from the set of defined locations at which the determined set of texts may be positioned by the first electronic device 102 to generate the text-enhanced icon. For example, the set of defined locations at which the determined set of texts may be positioned by the first electronic device 102 to generate the text-enhanced icon may be the first location and the second location. However, the second user 114 may select the set of defined locations as the "Zone 4" and "Zone 5". Thus, the set of defined locations may be determined based on the user input received from the second user 114 according to a compatibility of a platform displayed on the second electronic device 104.

At 1410, the text-enhanced icon including the graphical icon and the set of texts positioned based on the information about the set of defined locations may be rendered on a display device (for example, display device 314) associated with the second electronic device 104. The circuitry 302 may be configured to render, on the display device 314 associated with the second electronic device 104, the text-enhanced icon including the graphical icon and the set of texts positioned based on the information about the set of defined locations. Once the set of texts, and the information about the set of defined locations may be extracted, the set of texts may be positioned at the set of defined locations on the graphical icon, and the text-enhanced icon so obtained may be displayed on the display device 314. For example, if the graphical icon is the happy face emoji, the sets of texts is "happy" and "me", and the information about the set of defined locations is "Zone 1" corresponding to the second location and "Zone 3" corresponding to the first location, then circuitry 302 may position the sets of texts "happy" and "me" at the "Zone 1" and "Zone 3" of the happy face emoji (as shown in FIG. 4). The second user 114 may view displayed text-enhanced icon and may understand that the first user 112 is happy. Control may pass to end.

Although the flowchart 1400 is illustrated as discrete operations, such as 1404, 1406, 1408, and 1410, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate a first electronic device (for example, the first electronic device 102). Such instructions may cause the first electronic device 102 to perform operations that may include determination of a graphical icon associated with an emoji. The operations may further include determination of a set of texts associated with the emoji. The operations may further include generation of a text-enhanced icon based on the determined graphical icon and the determined set of texts. The generated text-enhanced icon may include the determined set of texts positioned at a set of defined locations associated with the determined graphical icon. The operations may further include generation of an encoded emoji sequence associated with the generated text-enhanced icon, based on the determined graphical icon, the determined set of texts, and the set of defined locations. The operations may further include transmission, to the second electronic device 104 associated with the first electronic device 102, the encoded emoji sequence to further render the generated text-enhanced icon.

Various embodiments of the disclosure may provide a non-transitory computer-readable medium and/or storage medium having stored thereon, computer-executable instructions executable by a machine and/or a computer to operate a second electronic device (for example, the second electronic device 104). Such instructions may cause the second electronic device 104 to perform operations that may include reception, from the first electronic device 102 associated with the second electronic device 104, an encoded emoji sequence associated with a text-enhanced icon. The text-enhanced icon may be generated based on a graphical icon associated with an emoji, a set of texts associated with the emoji, and information about a set of defined locations associated with the graphical icon. The operations may further include decoding the encoded emoji sequence associated with the generated text-enhanced icon. The operations may further include extraction of the graphical icon, the set of texts, and the information about the set of defined locations based on the decoded emoji sequence. The operations may further include render, on a display device (e.g., the display device 312) associated with the second electronic device 104, the text-enhanced icon including the graphical icon and the set of texts positioned based on the information about the set of defined locations.

Exemplary aspects of the disclosure may provide a first electronic device (such as, the first electronic device 102 of FIG. 1) that includes circuitry (such as, the circuitry 202). The circuitry 202 may be configured to determine a graphical icon (for example, the graphical icon 402A) associated with an emoji. The circuitry 202 may be configured to determine a set of texts (for example, the set of texts 404A) associated with the emoji. The circuitry 202 may be configured to generate a text-enhanced icon (for example, the text-enhanced icon 406A) based on the determined graphical icon and the determined set of texts. The generated text-enhanced icon may include the determined set of texts positioned at a set of defined locations associated with the determined graphical icon. The circuitry 202 may be configured to generate an encoded emoji sequence associated with the generated text-enhanced icon, based on the determined graphical icon, the determined set of texts, and the set of defined locations. The circuitry 202 may be configured to transmit to a second electronic device (for example, the second electronic device 104) associated with the first electronic device (for example, the first electronic device 102), the encoded emoji sequence to further render the generated text-enhanced icon.

Exemplary aspects of the disclosure may provide a second electronic device (such as, the second electronic device 104 of FIG. 1) that includes circuitry (such as, the circuitry 302). The circuitry 302 may be configured to receive, from the first electronic device 102 associated with the second electronic device 104, an encoded emoji sequence associated with a text-enhanced icon. The text-enhanced icon may be generated based on a graphical icon associated with an emoji, a set of texts associated with the emoji, and information about a set of defined locations associated with the graphical icon. The circuitry 302 may be further configured to decode the encoded emoji sequence associated with the generated text-enhanced icon. The circuitry 302 may be further configured to extract the graphical icon, the set of texts, and the information about the set of defined locations based on the decoded emoji sequence. The circuitry 302 may further configured to render, on a display device (e.g., the display device 312) associated with the second electronic device 104, the text-enhanced icon including the graphical icon and the set of texts positioned based on the information about the set of defined locations.

In an embodiment, the emoji may be received based on a user input including a sequence of characters associated with the emoji. In an embodiment, the emoji may be received based on a user input indicative of a selection of the emoji from a plurality of emojis. In an embodiment, the determined set of texts associated with the emoji correspond may to at least one of a name, a meaning, a description, a question, a context, a source, a person, a group of persons, or an uncertainty. In an embodiment, the set of texts may be determined based on a user input or correspond to defined texts associated with the emoji.

In an embodiment, the set of defined locations may be determined based on the user input. The set of defined locations may include at least one of: the first location at the left-outer region of the determined graphical icon, the second location at the right-outer region of the determined graphical icon, the third location at the top-outer region of the determined graphical icon, the fourth location at the bottom-outer region of the determined graphical icon, or the fifth location at the internal region of the determined graphical icon.

In an embodiment, the second electronic device 104 may receive, from the first electronic device 102, the encoded emoji sequence associated with the generated text-enhanced icon. The second electronic device 104 may decode the encoded emoji sequence associated with the generated text-enhanced icon. The second electronic device 104 may render, on the display device 312 associated with the second electronic device 104, the generated text-enhanced icon based on the decoded emoji sequence.

In an embodiment, the encoded emoji sequence may correspond to the Unicode character sequence. In an embodiment, the user input indicative of whether to enable text positioning within the text-enhanced icon may be received. The generation of the text-enhanced icon may be further based on the received user input.

In an embodiment, the circuitry 202 may be further configured to receive textual information including information related to the emoji. The circuitry 202 may be further configured to apply the natural language processing (NLP) model (e.g., the NLP model 214) on the received textual information. The circuitry 202 may be further configured to determine the context associated with the received textual information based on the application of the NLP model 214 on the received textual information. The set of texts associated with the emoji may be determined based on the determined context associated with the received textual information.

In an embodiment, the received textual information may corresponds to at least one of the email message, the text message, the closed-captioned text, or the sub-title text. In an embodiment, the first electronic device 102 may correspond to a broadcasting server, or a broadcasting device.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be positioned in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. A first electronic device, comprising:
    circuitry configured to:
        determine a graphical icon associated with an emoji;
        determine a set of texts associated with the emoji;
        generate a text-enhanced icon based on the determined graphical icon and the determined set of texts, wherein
            the generated text-enhanced icon includes the determined set of texts positioned at a set of defined locations associated with the determined graphical icon;
        generate an encoded emoji sequence associated with the generated text-enhanced icon, based on the determined graphical icon, the determined set of texts, and the set of defined locations; and
        transmit, to a second electronic device associated with the first electronic device, the encoded emoji sequence to further render the generated text-enhanced icon.

2. The first electronic device according to claim 1, wherein the circuitry is further configured to receive the emoji based on a user input including a sequence of characters associated with the emoji.

3. The first electronic device according to claim 1, wherein the circuitry is further configured to receive the emoji based on a user input indicative of a selection of the emoji from a plurality of emojis.

4. The first electronic device according to claim 1, wherein the determined set of texts associated with the emoji correspond to at least one of a name, a meaning, a description, a question, a context, a source, a person, a group of persons, or an uncertainty.

5. The first electronic device according to claim 1, wherein the set of texts are determined based on a user input or correspond to defined texts associated with the emoji.

6. The first electronic device according to claim 1, wherein the set of defined locations are determined based on a user input, and wherein the set of defined locations include at least one of:
    a first location at a left-outer region of the determined graphical icon,
    a second location at a right-outer region of the determined graphical icon,
    a third location at a top-outer region of the determined graphical icon,
    a fourth location at a bottom-outer region of the determined graphical icon, or
    a fifth location at an internal region of the determined graphical icon.

7. The first electronic device according to claim 1, wherein the second electronic device:
    receives, from the first electronic device, the encoded emoji sequence associated with the generated text-enhanced icon;
    decodes the encoded emoji sequence associated with the generated text-enhanced icon; and
    renders, on a display device associated with the second electronic device, the generated text-enhanced icon based on the decoded emoji sequence.

8. The first electronic device according to claim 1, wherein the encoded emoji sequence corresponds to a Unicode character sequence.

9. The first electronic device according to claim 1, wherein the circuitry is further configured to:
    receive a user input indicative of whether to enable text positioning within the text-enhanced icon, wherein
        the generation of the text-enhanced icon is further based on the received user input.

10. The first electronic device according to claim 1, wherein the circuitry is further configured to:
    receive textual information including information related to the emoji;
    apply a natural language processing (NLP) model on the received textual information; and determine a context associated with the received textual information based on the application of the NLP model on the received textual information, wherein
the set of texts associated with the emoji are determined based on the determined context associated with the received textual information.

11. The first electronic device according to claim 10, wherein the received textual information corresponds to at least one of an email message, a text message, a closed-captioned text, or a sub-title text.

12. The first electronic device according to claim 1, wherein the first electronic device corresponds to a broadcasting server, or a broadcasting device.

13. A second electronic device, comprising:
circuitry configured to:
receive, from a first electronic device associated with the second electronic device, an encoded emoji sequence associated with a text-enhanced icon, wherein
the text-enhanced icon is generated based on a graphical icon associated with an emoji, a set of texts associated with the emoji, and information about a set of defined locations associated with the graphical icon;
decode the encoded emoji sequence associated with the generated text-enhanced icon;
extract the graphical icon, the set of texts, and the information about the set of defined locations based on the decoded emoji sequence; and
render, on a display device associated with the second electronic device, the text-enhanced icon including the graphical icon and the set of texts positioned based on the information about the set of defined locations.

14. The second electronic device according to claim 13, wherein the set of defined locations are determined based on a user input, and wherein the set of defined locations include at least one of:
a first location at a left-outer region of the graphical icon,
a second location at a right-outer region of the graphical icon,
a third location at a top-outer region of the graphical icon,
a fourth location at a bottom-outer region of the graphical icon, or
a fifth location at an internal region of the graphical icon.

15. A method, comprising:
in a first electronic device:
determining a graphical icon associated with an emoji;
determining a set of texts associated with the emoji;
generating a text-enhanced icon based on the determined graphical icon and the determined set of texts, wherein
the generated text-enhanced icon includes the determined set of texts positioned at a set of defined locations associated with the determined graphical icon;
generating an encoded emoji sequence associated with the generated text-enhanced icon, based on the determined graphical icon, the determined set of texts, and the set of defined locations; and
transmitting, to a second electronic device associated with the first electronic device, the encoded emoji sequence to further render the generated text-enhanced icon.

16. The method according to claim 15, wherein the determined set of texts associated with the emoji correspond to at least one of a name, a meaning, a description, a question, a context, a source, a person, a group of persons, or an uncertainty.

17. The method according to claim 15, further comprising:
receiving a user input indicative of whether to enable text positioning within the text-enhanced icon, wherein
the generation of the text-enhanced icon is further based on the received user input.

18. The method according to claim 15, further comprising:
receiving textual information including information related to the emoji;
applying a natural language processing (NLP) model on the received textual information; and
determining a context associated with the received textual information based on the application of the NLP model on the received textual information, wherein
the set of texts associated with the emoji are determined based on the determined context associated with the received textual information.

19. The method according to claim 18, wherein the received textual information corresponds to at least one of an email message, a text message, a closed-captioned text, or a sub-title text.

20. A non-transitory computer-readable medium having stored thereon, computer-executable instructions that when executed by a first electronic device, causes the first electronic device to execute operations, the operations comprising:
determining a graphical icon associated with an emoji;
determining a set of texts associated with the emoji;
generating a text-enhanced icon based on the determined graphical icon and the determined set of texts, wherein
the generated text-enhanced icon includes the determined set of texts positioned at a set of defined locations associated with the determined graphical icon;
generating an encoded emoji sequence associated with the generated text-enhanced icon, based on the determined graphical icon, the determined set of texts, and the set of defined locations; and
transmitting, to a second electronic device associated with the first electronic device, the encoded emoji sequence to further render the generated text-enhanced icon.

* * * * *